United States Patent [19]

Thomas et al.

[11] Patent Number: 4,504,126
[45] Date of Patent: Mar. 12, 1985

[54] DIGITAL PLATE MAKER SYSTEM AND METHOD

[75] Inventors: E. Raymond Thomas; Lysle D. Cahill, both of Dayton; John L. Tibbits, Centerville, all of Ohio; Kenneth D. Fraser, Scarboro, Canada; John F. Keane, Bellbrook, Ohio; Stanley C. Harting, Kettering, Ohio; George H. Kramer, Xenia, Ohio; Ronald J. Duke, Miamisburg, Ohio; Theodore A. Kessis, Dayton, Ohio; John C. Butler; Gary L. Frank, both of Centerville, Ohio; John A. Lawson, Dayton, Ohio

[73] Assignee: Coulter Systems Corporation, Bedford, Mass.

[21] Appl. No.: 538,969

[22] Filed: Oct. 4, 1983

Related U.S. Application Data

[62] Division of Ser. No. 139,462, Apr. 11, 1980, Pat. No. 4,408,868.

[51] Int. Cl.³ .................................................. G02B 9/34
[52] U.S. Cl. ...................................... 350/469; 350/412
[58] Field of Search .............................. 350/469, 412

[56] References Cited

U.S. PATENT DOCUMENTS 4,251,131 2/1981 Tojo ........................................ 350/469

OTHER PUBLICATIONS

Hopkins et al., "Optics for Laser Scanning," Optical Engineering, vol. 15, No. 2, 3&4/1976, pp. 90–94.

Primary Examiner—John K. Corbin
Assistant Examiner—Rebecca D. Gass
Attorney, Agent, or Firm—Silverman, Cass & Singer, LTD

[57] ABSTRACT

Graphics and text data are combined selectively to discharge incremental areas of a charged electrophotographic member to form thereon a latent text and/or graphics image represented by the graphics and text data, the imaged member thereafter being toned and output from the system so that the toned image may be fused on the member and the member may be used as a printing plate in an offset lithographic printing press. The apparatus includes an optical system that may form a maximum of 22 individual rays which are deflected twice through a field flattening lens and then onto the charged member. The optical system further includes an optical scale or grating which provides electrical signals indicating the precise location of the individual rays along scan lines on the member. The apparatus further includes an electronic system which generates electrical signals from the graphics and text data to form the 22 individual rays. The text data is used to modulate signals produced by the graphics data, the result of the modulation being beam control signals used to form the 22 individual rays. The apparatus further includes a toning system that provides a vertical meniscus of toning fluid, the meniscus being essentially stationary with the electrophotographic member as the electrophotographic member is rotated past the toning station.

2 Claims, 23 Drawing Figures

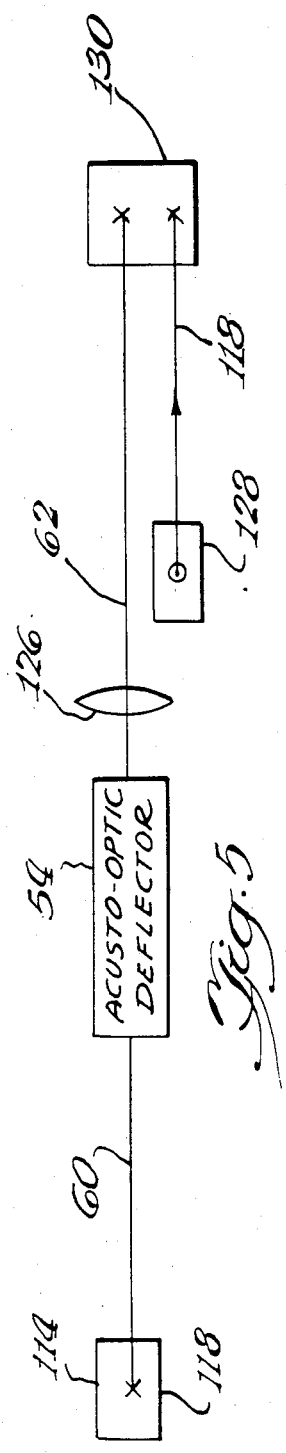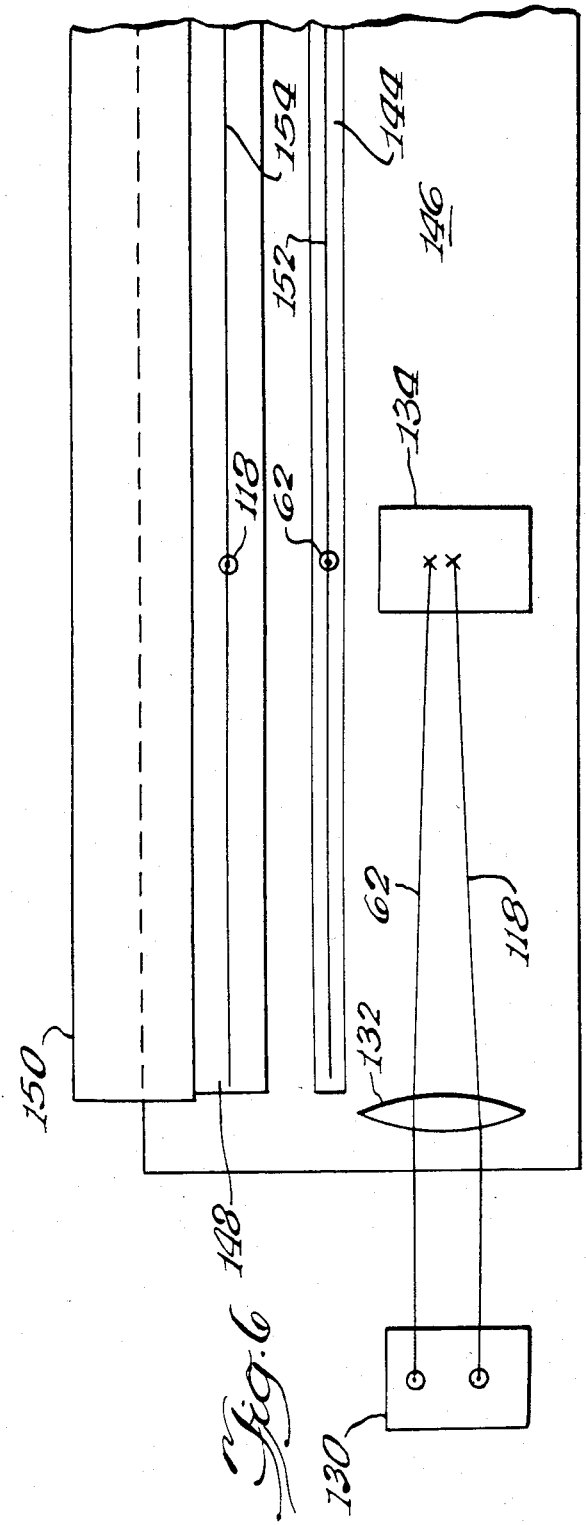

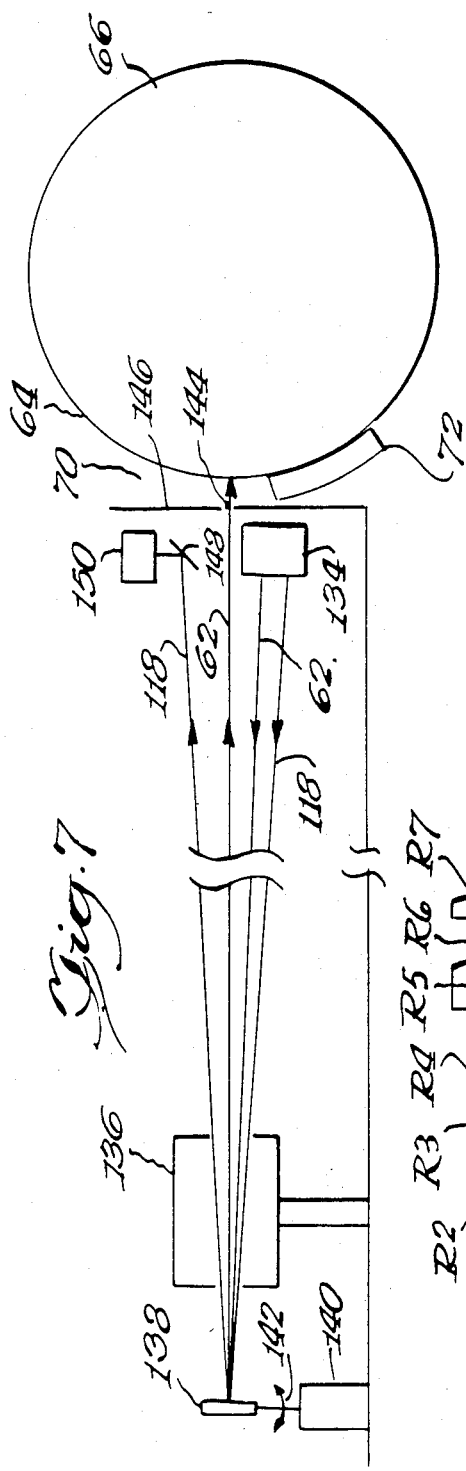
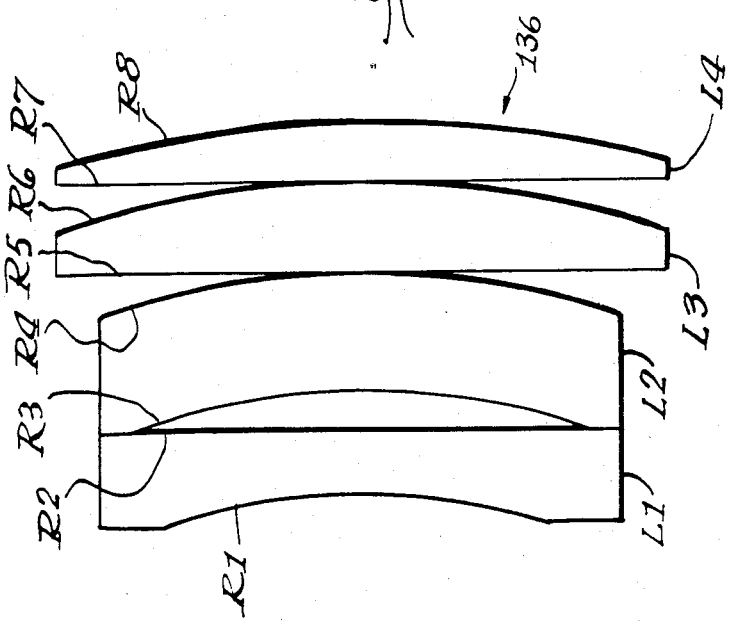
Fig. 7
Fig. 8

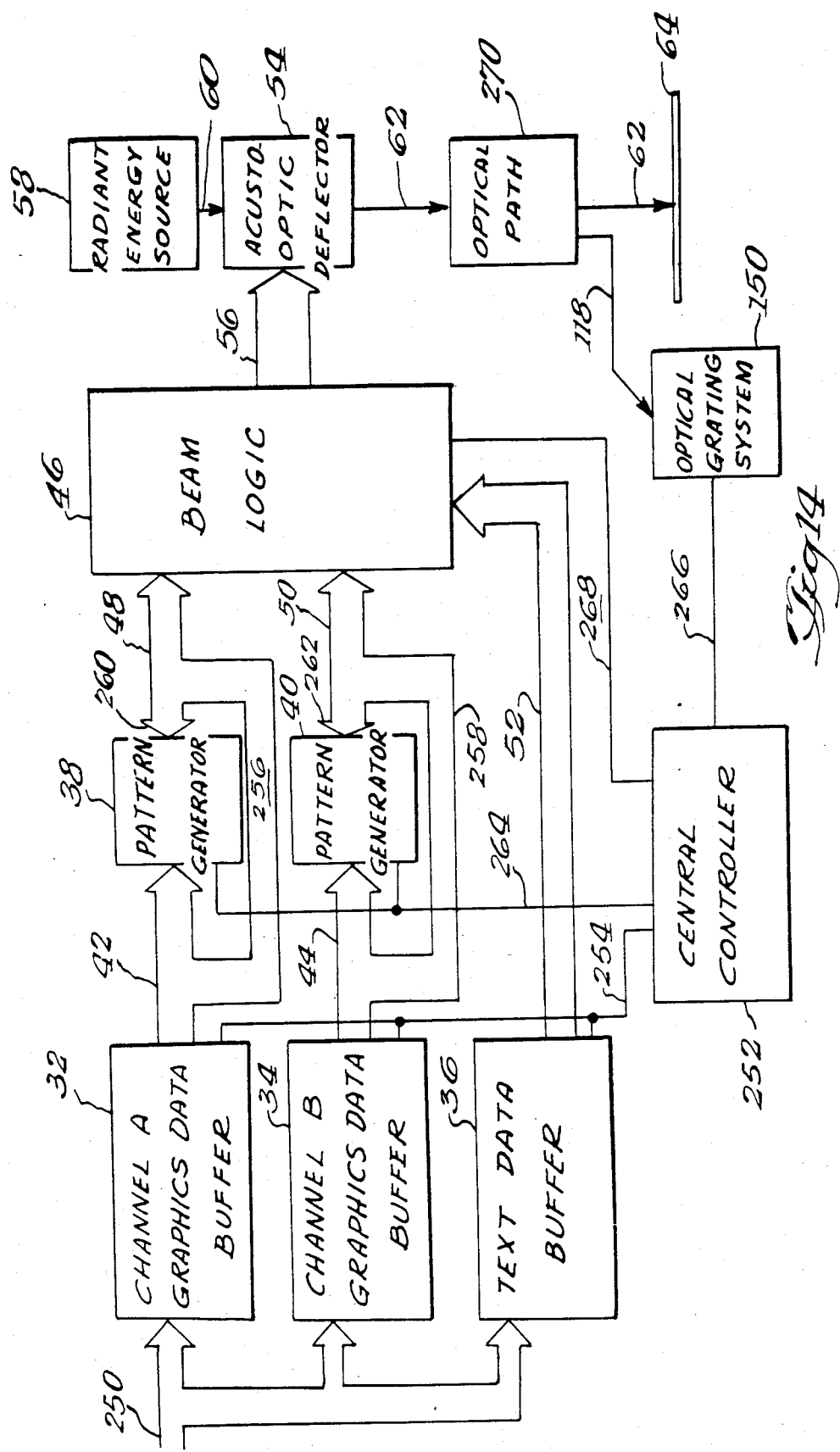

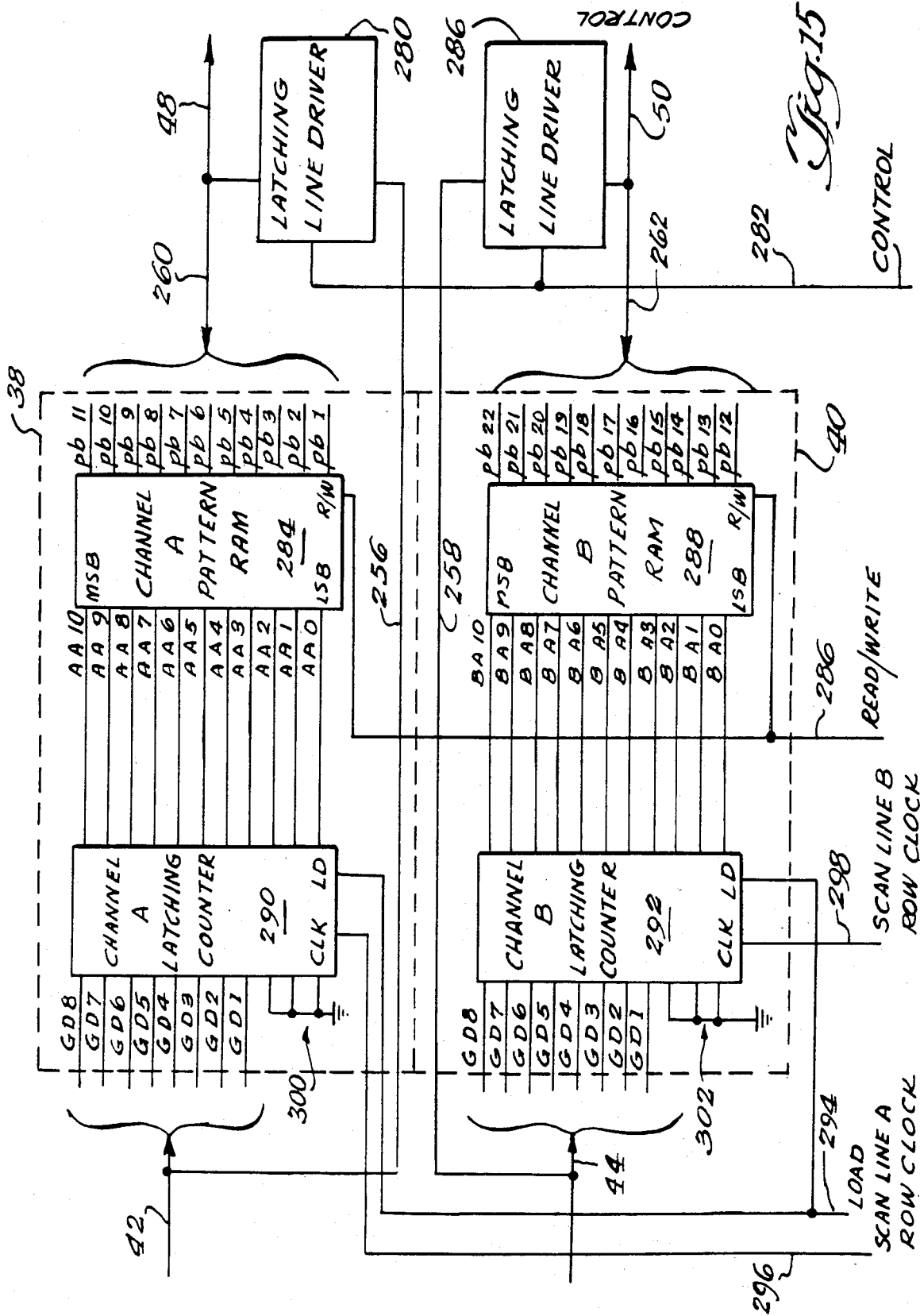

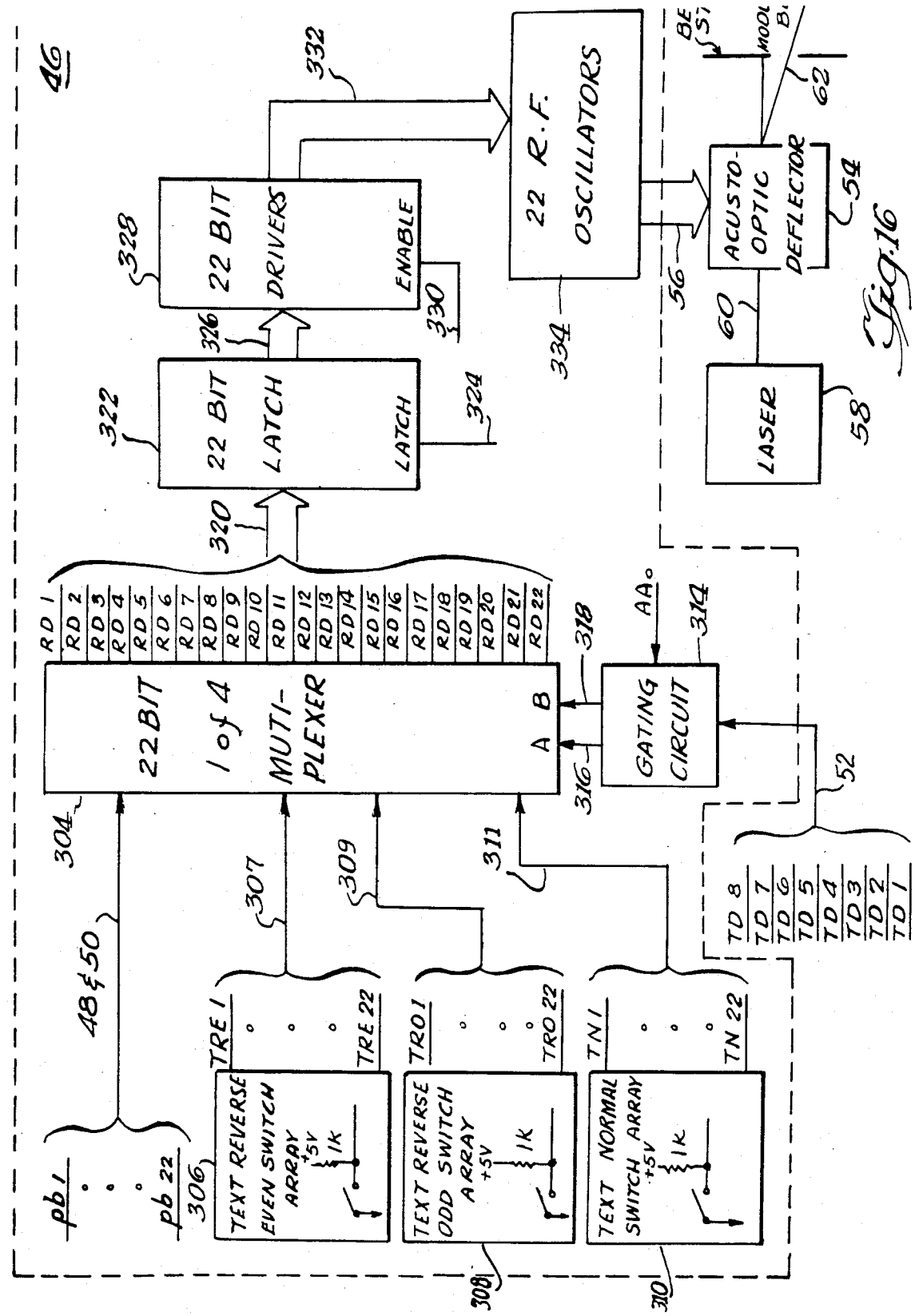

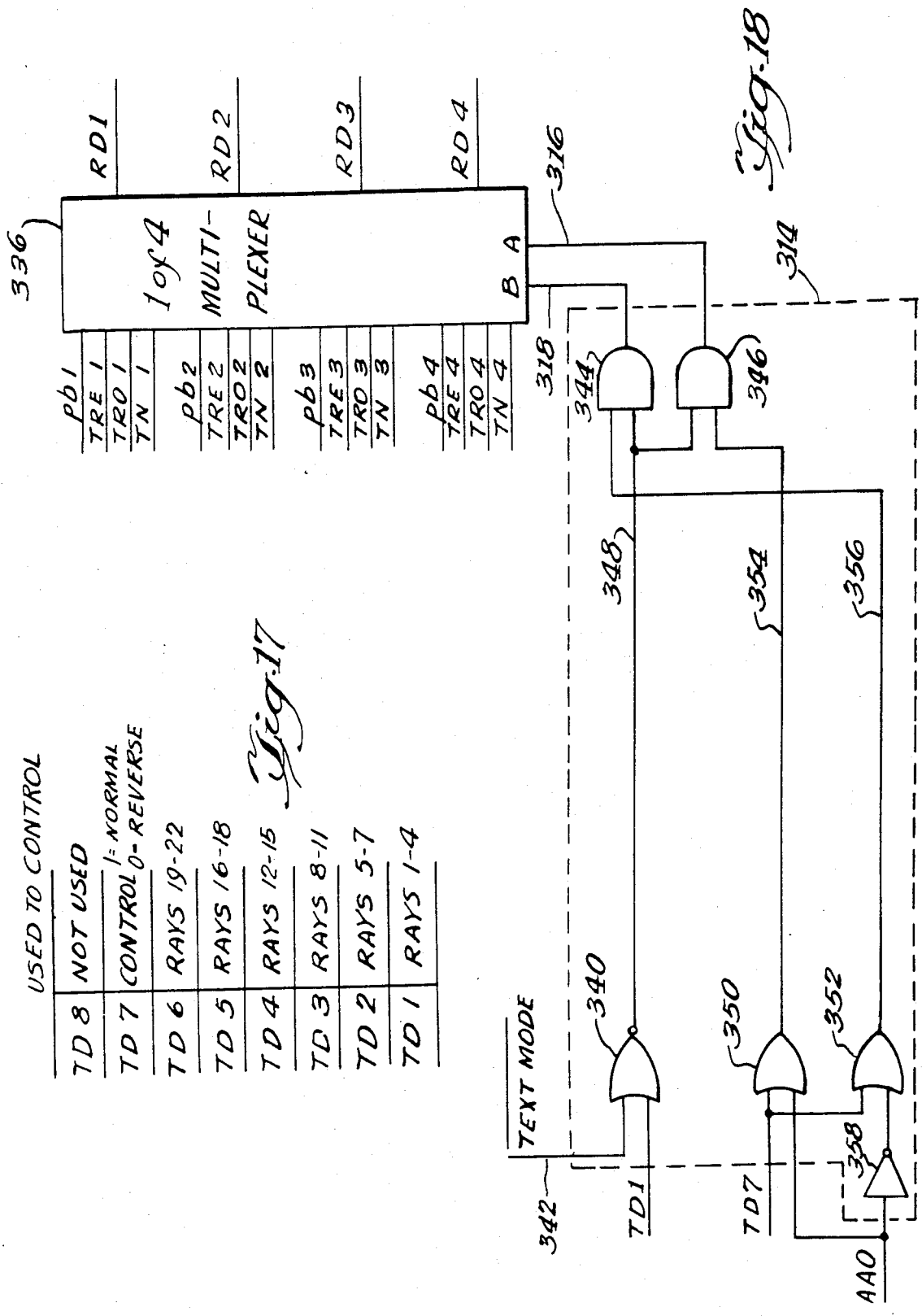

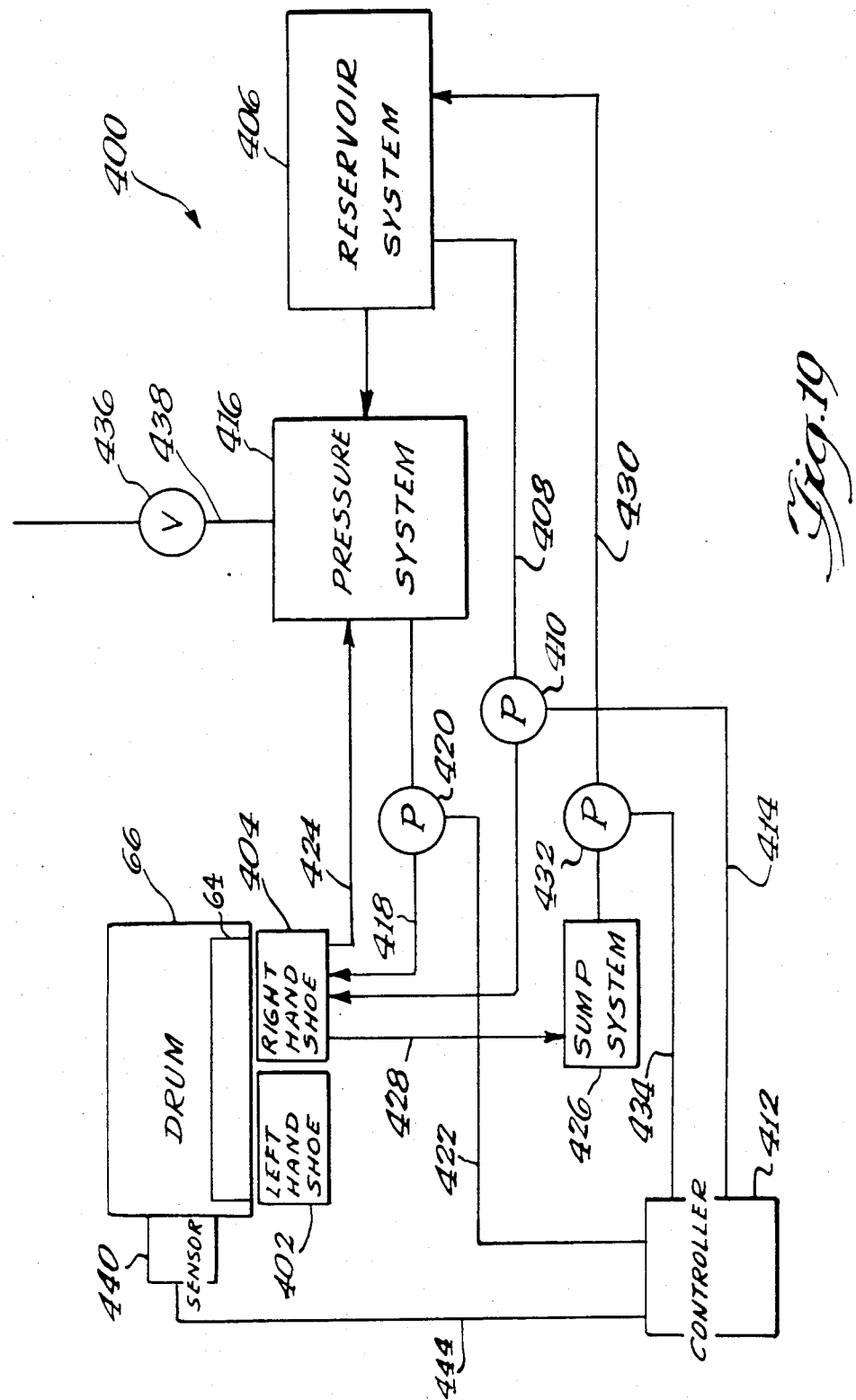

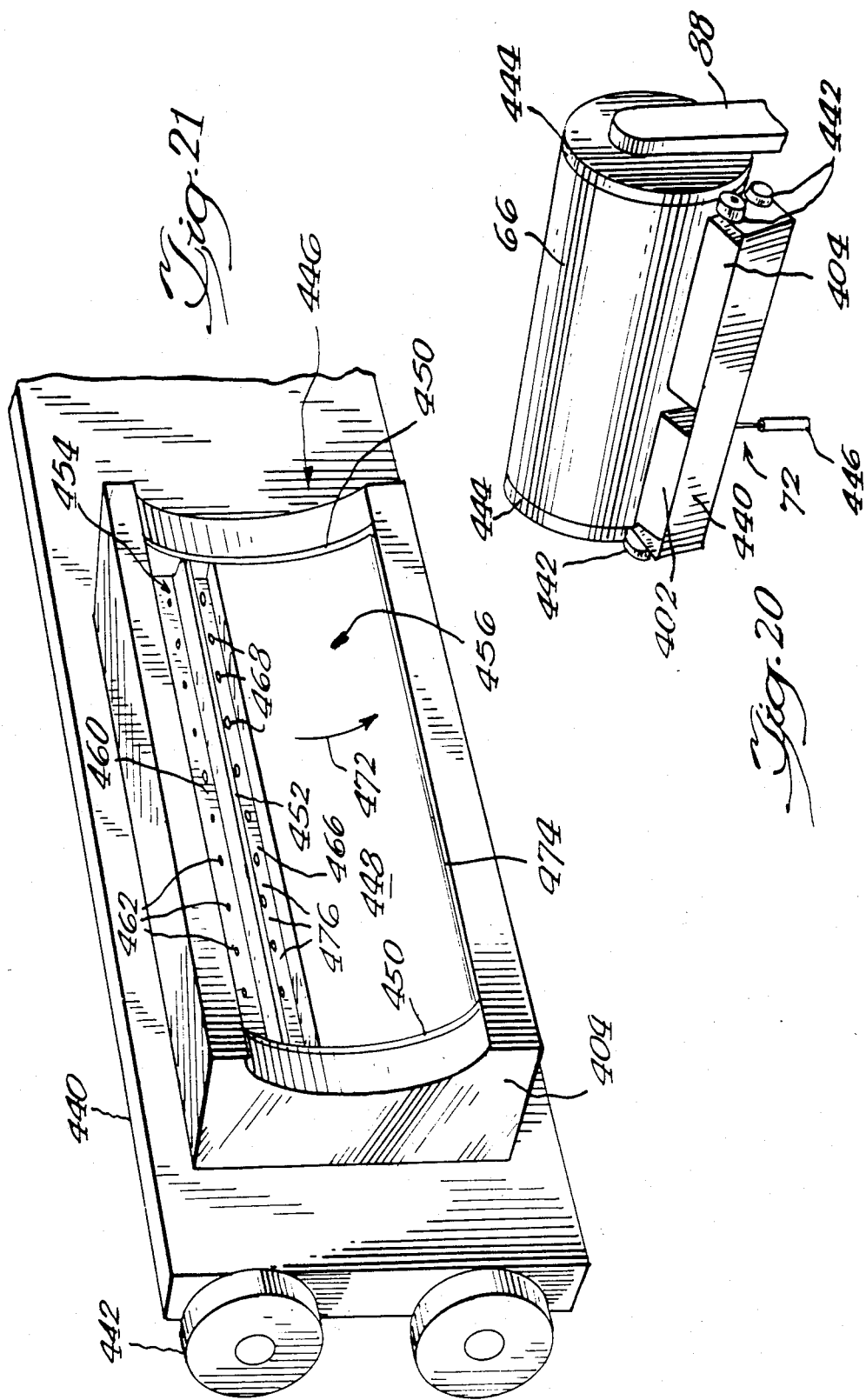

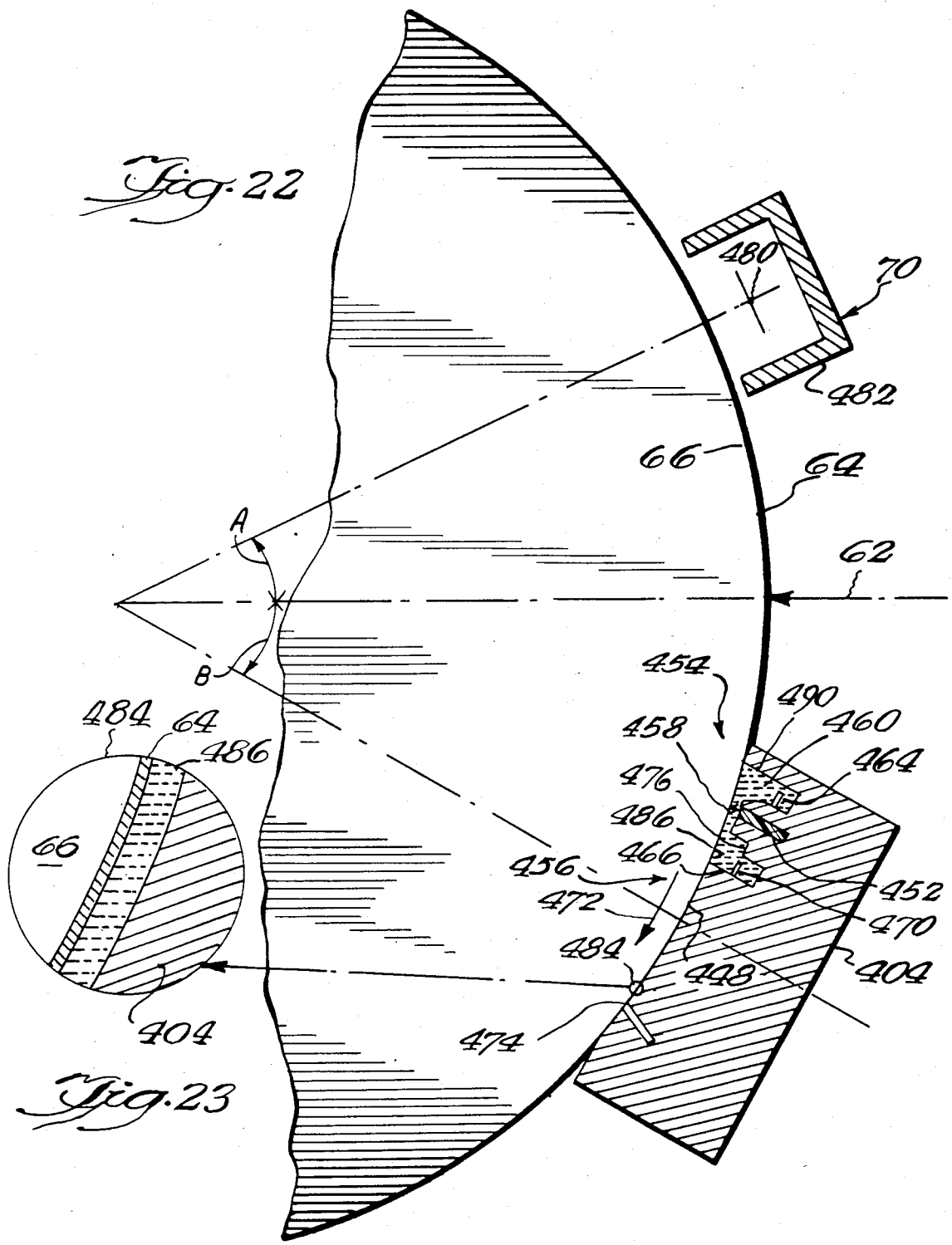

DIGITAL PLATE MAKER SYSTEM AND METHOD

This application is a division of application Ser. No. 139,462, filed Apr. 11, 1980, now U.S. Pat. No. 4,408,868.

CROSS REFERENCE TO RELATED APPLICATION AND PATENT

Reference is made to a co-pending application Ser. No. 11,320 filed Feb. 13, 1979 now U.S. Pat. No. 4,468,706, and entitled "DIGITAL LASER PLATE MAKER AND METHOD", the applicant being Lysle D. Cahill.

Reference is also made herein to a U.S. Pat. No. 4,025,339 issued on May 24, 1979 to Manfred R. Kuehnle.

Both the application and the patent above identified are owned by the Assignee of the application herein.

FIELD AND BACKGROUND OF THE INVENTION

The field of the invention comprises apparatus and methods for imaging electrophographic members by means of radiant energy devices such as lasers, the imaged electrophotographic members being thereafter used for printing. In the case of lithographic offset printing, the imaged member itself is treated to render toned and untoned parts hydrophobic and hydrophilic, respectively, and the member comprises the printing plate without further processing. In other cases, the toned electrophotographic member may be used as an information source by reading the images or projecting them if transparent or photographically reproducing them if desired. The preferred use of the invention is to make printing plates upon metal substrates such as stainless steel. These substrates are coated with a type of photoconductive coating which will be described hereinbelow.

In the printing industry, printing plates for printing both graphics and text have in the past been produced manually with the graphics images being reproduced using the so-called half-tone process. In this process several photographic steps are used to reproduce the graphics image in an array of dots of varying size to reproduce the image on the printing plate. Text information has in the past been hand set, but now may be set by machine under control of electronic devices.

Forming printing plates carrying both graphics and text images may involve several steps, especially when color graphics are to be reproduced. In such a case, several color separation plates must be made for each color to be printed with the text information being carried on the plate in which color the text is to be printed. When text information is to be located within the field of the graphics image, additional steps are required to form the solid printing text areas for the plates in that particular color and to remove the graphics image from those same text areas on the remainder of the color separation plates. This of course adds to the number of process steps required to produce the desired graphics and text images. The steps of forming the text image to be printed in the graphics field is commonly known as overburning while the process of removing the graphics image from those same text areas in the other color separation plates to be printed is referred to or is commonly known as stripping.

In overburning, the negatives which form the graphics image and the text image to be formed in that field are overlayed one on another to form the desired color separation printing plate. In stripping, other techniques must be used to remove the graphics information from those same text image areas.

The process of forming printing plates containing both graphics and text data recently has been implemented electronically using essentially the same methods as were performed manually. Advanced systems however are able to complie data from various input devices that may be used to form both graphics and text information on a printing plate. These sytems have their drawbacks in that separate scanning cycles must be performed to form the graphics and text images on a single printing plate and in addition, complex switching circuits must be constructed to switch between text and graphics image formation when text images are to be formed within the field of a graphics image.

The apparatus and method of the present invention overcome the drawbacks presented by the manual and previous electronic systems by providing a system in which one pass of a beam of radiant energy may form both graphics and text images in response to graphics and text data input thereto. Formation of the graphics and text images may occur independently of one another so that different imaging schemes may be used to form scaled densities of the graphics images and the binary densities of the text images.

Formatting of the data in accordance with the invention is such that the graphics data contains information related to the relative scaled densities of incremental areas of the graphics image with the remainder of the graphics data for the remainder of the printing plate being a nullity to clear the surface of the charged electrophotographic member. The text data is formated such that it does not affect the formation of the images carried by the graphics data except in locations where text images are to be formed.

Formation of text images within the field of graphics images for several different color separation plates is performed simply by reversing the logical sense of a control bit of every text data digital word. Thus, to produce text images of one color such as blue in the field of a multicolor printed graphics image, the same text data may be used for all of the color separation plates with the control bit for the color separation plate used to print the color blue being set to one logical state and being set to the other logical state for the remainder of the color separation plates.

Thus the apparatus and method of the invention provide for imaging of an entire printing plate with graphics and text information in a single pass of a beam of radiant energy.

The apparatus and method of the invention include an optical system in which a beam of radiant energy from a monochromatic source such as a laser is used selectively to discharge and to leave charged incremental areas of a charged electrophotographic member. Part of the beam is split therefrom and is used as a reference beam. The remainder of the beam is modulated to provide a scanning beam or a fine beam comprised of individual rays of radiant energy with each ray able to discharge an incremental area of the member. The reference beam and scanning beam or fine beam are aligned vertically with one another with the vertical alignment being used in an optical grating system precisely to determine the location of the scanning beam along the surface of the member. A field flattening lens is used in which both the reference and fine beams are passed through and back again to the member, the field flattening lens providing the maintenance of a focused image on the surface of the member across every scan line.

A common technique to determine the instantaneous position of the scanning beam along a scan line of the member is to employ an optical scale or grating composed of alternate bars or spaces of opaque and transparent, or absorbing and reflecting surfaces or areas. These alternating spaces occur at intervals equal to the spacing between formable elements on the member to provide electrical signals indicating the alignment of the scanning beam with the elements. Light passing through or being reflected from such a grating is detected with a photosensitive device which converts the detected energy into electrical pulses.

Over relatively short scan widths, say 10 inches or so, the problem of accurately gathering or collecting light pulses from an optical scale and directing them to the photosensor is readily accomplished with relatively simple optics. In much greater scan widths however the cost of collecting optics rises exponentially and quickly reaches prohibitive levels. The apparatus of the invention herein has an active scan length of preferably 24 inches. The cost of conventional optics for collecting a reference beam across such a length and establishing a beam feed-back signal within 1/300 of an inch accuracy is prohibitive.

The concept of using a glass rod or fiber in such a grating collection system is known. The principle used involves having the beam strike the rod perpendicular to its cylindrical surface to collect the intercepted energy in the rod and detect the intercepted energy as it exits the rod at either end thereof. Original results with a short piece of ⅜ inch diameter glass rod provided poor results, it being believed that most of the energy from the beam was transmitted through the diameter of the rod so that the light output at either end of the rod was too low to be of use.

The concept of using a hollow metal tube with a high reflective interior surface to reduce transmissive losses also was investigated. The tube used had a very narrow length-wise slit to provide for entrance of the radiant energy reference beam, and a photosensor was mounted at one end of the tube with a mirror located at the other to reinforce the reflected energy levels. It was believed that the reference beam would strike the rear internal surface of the tube and give rise to multiple reflections which would propagate along the tube and result in a useful output level at the end mounted sensor. The optical surface smoothness on the interior was difficult to control and in turn unsatisfactory reflections and distributions were obtained. At a consequency thereof, signal levels obtained from the hollow metal tube varied greatly as a function of the beam position from the sensor along the scan length. Automatic gain and compensation techniques were implemented to modulate the electronic signal from the sensor, but none of these proved successful. In re-evaluating the glass rod technique, it was believed that if the transmissive losses of energy could be prevented by containing the light within the fiber as within the hollow tube, the rod collecting scheme might succeed.

A 1¾ inch rod was used because the internal diameter of the existing hollow tube was about 2 inches and this would facilitate concentric mounting of the rod within the tube, and would further minimize energy losses by decreasing the concentric area. Essentially, the glass fiber rod was mounted within the length of the tube. Initial tests met with little success until a strip of masking tape was attached longitudinally of the rod opposite the beam entry point. Increased energy level from the non-reflecting surface of the tape was immediately recognized to be the result of eliminating the air-gap index of refraction (a high loss component) while containing and reflecting the entrapped energy in the rod. It was quickly determined that highly reflective material such as a typewriter corrector fluid applied to the rod's cylindrical surface would be highly efficient in preventing the transmissive loss and aid in providing good Lambertian distributions. It was later determined that it was not necessary to coat the entire surface of the cylinder or rod. A narrow stripe about ¼ of an inch wide along the rod proved to be more than adequate. Test results for rods of 0.78 inch, 1.0 inch, 1.5 inch and 1.75 inch diameter indicated that the best results for the bar collector used in the present invention would be obtained with a bar diameter somewhere between 1.5 inch and 1.75 inch.

Two prior art patents which disclose using a bar collector in an optical scanning or sensing apparatus are U.S. Pat. Nos. 4,040,748 and 4,040,745. These patents however do not appear to disclose the use of a bar collector over the length provided by the invention herein.

The apparatus and method of the invention further include an electronic system that controls the graphics and text imaging process of the invention. As has been explained, the invention provides for the intermixed formation of graphics and text images on the electrophotographic member in one sweep or pass of the imaging beam of radiant energy. The electronics provided are such that formation of the graphics and text images occur independently of one another, i.e., both graphics and text images may be formed at any location of the member.

The electrophotographic member used with the apparatus and method of the invention proives incremental areas to be imaged that are finer than are presently available and provides that those elements may be formed at a more rapid rate and with less energy than has previously been provided for. This electrophotographic coating will be further referred to hereinafter and is the coating described and claimed in U.S. Pat. No. 4,025,339.

The apparatus and method of the invention further include a toning system which applies minute toning particles to the areas of the latent image that remain charged. This toning system provides an essentially vertical meniscus closely spaced from the horizontal line at which imaging of the member occurs so that there is a minimal loss of voltage, representing the latent image on the electrophotographic member, from imaging to toning. Toning systems are known in which toning fluid is applied to the bottom of a rotating drum carrying the electrophotographic member wherein the distance from the imaging to the toning is minimal. In the apparatus of the present invention however, a large drum is used which rotates relatively slowly so that if a toning system were used that is located at the bottom of the drum, substantially all of the latent image would become discharged by the time the member was rotated to the toning station. Therefore, the toning station must be located closely spaced from the plane or horizontal line at which imaging occurs, which requires that toning fluid be applied in a layer which is essentially vertical.

This vertical layer or meniscus is provided by a supply or pressure system sealed to the atmosphere, providing toning fluid to escape therefrom in the form of the layer or meniscus of toning fluid. The rate of escape of the toning fluid is controlled by a valve admitting atmosphere to the otherwise sealed pressure system so that the rate of flow of the toning fluid from the system is substantially equal to the movement of the member past the toning station to provide a vertical meniscus of toning fluid that is substantially stationary relative to the member.

SUMMARY OF THE INVENTION

In accordance with the invention a method and apparatus are disclosed that receive binary digital graphics and text data and in response thereto form a toned latent image on an electrophotographic member, the toned image thereafter being fused to the member and the member being used as a printing plate in an offset lithographic printing press. The system including an optical system, an electronics system and a toning system.

The optical system provides a fine beam of up to 22 individual rays of radiant energy with which to discharge incremental areas of the electrophotographic member. The optical system further provides field flattening to maintain a focused image of the individual rays across every scan line along the original image. An optical scale or grating system comprised of a bar collector is provided that receives a reference beam of radiant energy vertically aligned with the fine beam, the bar collector receiving the reference beam across the length of every scan line. The bar collector directs the radiant energy from the reference beam to a sensor that provides electrical signals indicating the position of the fine beam along the scan line.

The electronics system implements the formation of the text and graphics images. The graphics data is used to generate beam modulation signals to form the desired number of individual rays for imaging. The text data is used to modulate the beam modulation signals so that text images may be overlayed on graphic images or formed outside of the fields of graphics images.

A toning system for toning the latent images provides a vertical meniscus of toning fluid that substantially is stationary relative to the electrophotographic member as the member is rotated past the toning system.

BRIEF DESCRIPTION OF THE DRAWINGS

FIG. 5 is a partial schematic diagram of the optical system illustrated in FIG. 4 taken along the lines 5—5 and in the direction indicated;

FIG. 6 is a partial schematic diagram of the optical system illustrated in FIG. 4 taken along the lines 6—6 and in the direction indicated;

FIG. 7 is a partial schematic diagram of the optical system illustrated in FIG. 4 taken generally along the lines 7—7 and in the direction shown;

FIG. 8 is a representation of the elements of a field flattening lens system;

FIG. 14 is a schematic block diagram of the electronic and optical systems of the apparatus;

FIG. 15 is a schematic block diagram of the pattern generators illustrated in FIG. 14;

FIG. 16 is a schematic block diatram of the beam logic circuit illustrated in FIG. 14;

FIG. 17 is a chart illustrating the groups of individual rays that are controlled by individual bits of text data words;

FIG. 18 is a schematic block diagram of the multiplex and gating circuits of FIG. 16;

FIG. 19 is a schematic block diagram of the toning system of the apparatus;

FIG. 20 is a perspective view of the toning station and drum;

FIG. 21 is a perspective view of a shoe of the toning system illustrated in FIG. 19;

FIG. 22 is a sectional view of a charging station and the shoe illustrated in FIG. 21 illustrating the relationship of the charging station and shoe to the drum; and FIG. 23 is an exploded view of a portion of the interface between the drum and the shoe illustrating the relative positions of the electrophotographic member, the toning fluid and the shoe.

DESCRIPTION OF THE PREFERRED EMBODIMENT

Figure 1:
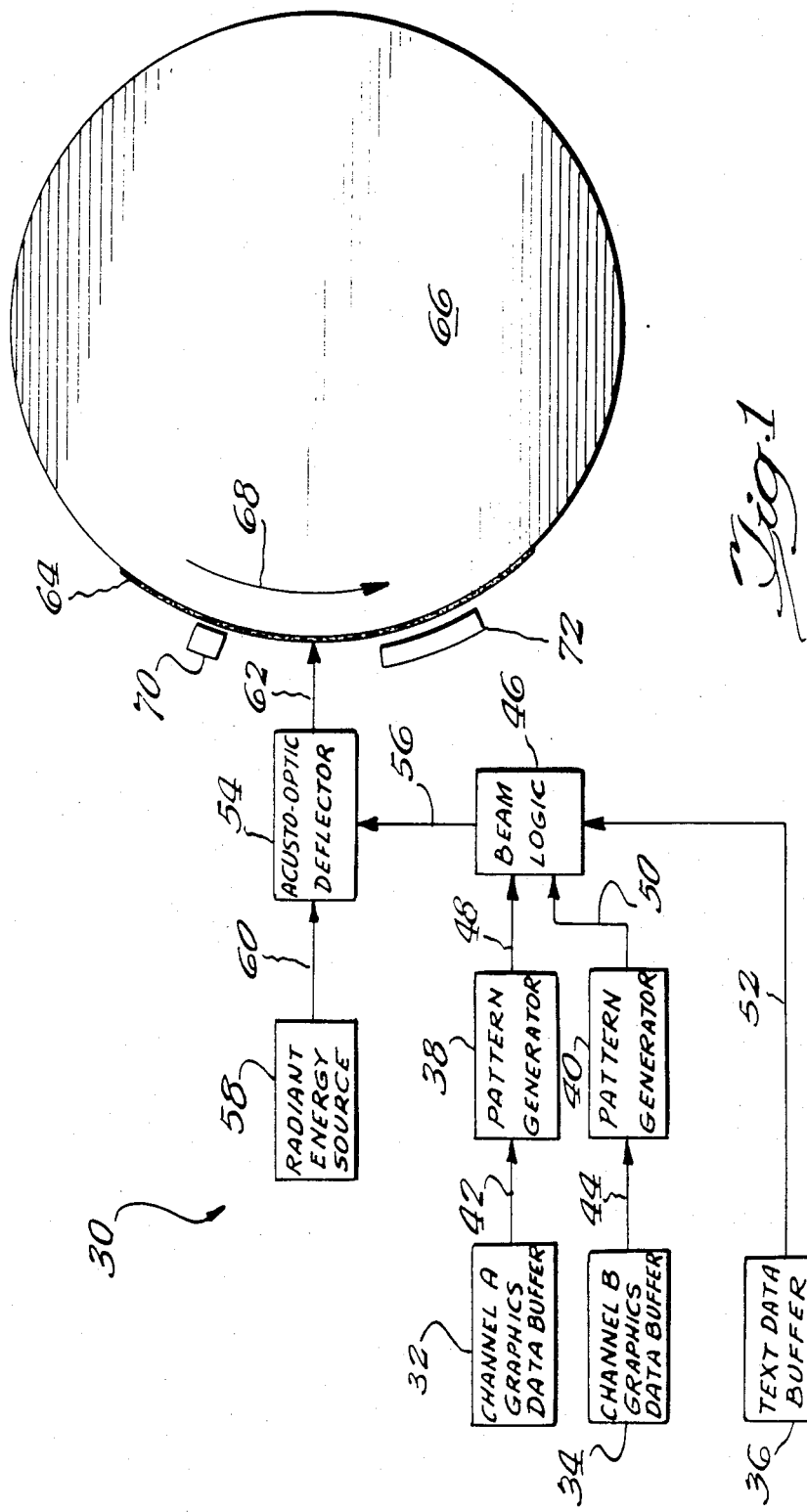
FIG. 1 is a schematic block diagram of the apparatus of the invention illustrating the process of the invention.

In the preferred embodiment, the imaging device receives digital data representing the graphics and text images to be printed or otherwise reproduced. This digital data is received from a compiling system which obtains raw data from such as an optical scanning system, text input stations, etc., and compiles or formats the data representing the graphics and text materials into a form which may be used by the imaging device of the invention herein. The data received by the imaging device also may be generated or synthesized by a computer or by other means and may be presented to the imaging device from a memory in which it has been stored or it may be presented on line as it is generated or synthesized if the generation of sythesization rate is equal to or less than the imaging rate of an imaging device herein.

The output of the imaging device herein is an electrophotographic member carrying a toned latent image of charged and discharged incremental areas formed in response to the digital data. The toned member thereafter may be fused and processed for use as a printing plate in an offset lithographic printing press with the toned areas carrying ink to a receptor to form the tonal graphics and text images. If color printing is desired, several electrophotographic members carrying toned latent images are formed, one for each color that is desired to be printed. Each member carries a toned latent image for each of what are commonly known as color separations.

The imaging device or imager used in the preferred embodiment of this invention uses a laser beam to image an electrophotographic member that includes a photoconductive coating that previously has been charged. The member is carried on a rotary drum, is toned on the drum and thereafter may be used to transfer the toned image or to serve as a medium for projection or printing of the image. In the case of printing, the toned image is used to carry ink in a printing press, the member having been treated to achieve hydrophilic and hydrophobic areas to enable offset lithographic use of the member as a printing plate.

The preferred use of the imaged member herein is as a printing plate and the member has an electrophotoconductive imagable coating that is preferably the receptor of the laser beams which comprise the output from the appartus of the invention. Such coating is that which is described and claimed in U.S. Pat. No. 4,025,339, incorporated herein by reference.

The apparatus and method of the invention may best be understood by considering that the binary digital data input to the apparatus is used binarily to modulate a beam of radiant energy from a laser selectively to discharge and leave charged incremental areas of the charged electrophotographic member. Thereafter, the selectively charged and discharged pattern or image carried on the member is toned and output from the apparatus.

The electrophotographic member is carried on the outer circumference of a drum which is rotated around its longitudinal axis. Charging, imaging and toning of the member occurs sequentially at adjacent stations as the member is moved past the stations by the rotating drum. Charging of the electrophotographic member may be by any means desired and in the preferred embodiment occurs by placing adjacent the outer circumference of the drum a corona wire having a high voltage applied thereto. Toning of the imaged member occurs by applying to the member a quantity of carrier fluid containing toner particles. The charging and toning occurs at stations respectively above and below an imaging plane. Imaging of the charged electrophotographic member occurs by passing a fine beam of radiant energy from a laser across the surface of the member in image lines that are parallel to the longituinal axis of the drum and lie in the imaging plane. Imaging of the entire surface of the charged member occurs in sequential image lines as the member is moved by the drum past the imaging plane.

The digital input to the imaging apparatus is in the form of two channels of graphics data and one channel of text data. Each digital word of the graphics data is used to form one graphics picture element or graphics pixel on the coating of the electrophotographic member. Every imaging line is comprised of two scan lines of graphics pixels with each channel of graphics data respectively controlling the formation of graphics pixels in one scan line.

The text data controls the formation of text pixels across the width of the image line (comprised of two scan lines) and therefore only one channel of text data is required. Every word of the text data is comprised of 8-bits of information with the least significant six bits each controlling the binary density of a text pixel, the next least significant bit serving as a control bit, and the most significant bit not being used.

The graphics data and text data are formated such that they each may form respective graphics or text images across the entire area of the electrophotographic member. The electronics of the invention herein uses both text and graphics data to form one channel of laser modulation signals. Further, in the imaging apparatus herein, the information carried by the text data is used to gate the formation of the individual rays of the fine beam of radiant energy, each of which rays is used to discharge an incremental area on the charged electrophotographic member. Simply stated, the text data is used to gate or modulate the formation of graphics pixels in response to the graphics data: if the text data is a nullity and no text images are to be formed on the member, the information carried by the graphics data will form the graphics image represented thereby and discharge the remainder of the member.

Where the text data contains information representing a text image to be formed on the member, the text data may either inhibit or enable the formation of individual rays of the fine beam depending on the logical state of the control bit included in each word of text data. When the text data inhibits the formation of individual rays of the fine beam, a text image is formed on the member that will be toned and in the printing plate will carry ink to the receptor to print a solid image. This is the case where printed, such as black, text is desired on any background. When the text data enables formation of individual rays of the fine beam, text pixels are discharged on the member with the discharged areas of the member forming areas of the printing plate which do not print on the receptor or which remain clear. This is the case where clear or non-printed text is desired within a graphics image.

In the preferred embodiment of the invention, the text pixels are nine times more numerous than the graphics pixels, i.e., for every graphics pixel there are nine text pixels which may be discharged or left charged. The resolution provided by the text pixels is not, however, nine times the resolution provided by the graphics pixels because of overlap of the text pixels. Of course, it will be understood that the electrophotographic member is not physically divided into picture areas or pixels of any type; there are no scan lines or image lines scribed on the member but that these terms are used only to describe the operation of the imaging apparatus and method.

Referring now to FIG. 1 of the drawing, the apparatus of the invention illustrated schematically is indicated generally by the reference character 30. Two channels of graphics data are received by the apparatus respectively at channel A and channel B graphics data buffers 32 and 34. Text data is received into text data buffer 36. The graphics data contained in data buffers 32 and 34 individually are applied to pattern generators 38 and 40 over leads 42 and 44. In pattern generators 38 and 40, the density information carried by the digital words of the graphics data are converted into patterns of elements which are to be formed in graphics pixels on the member, the pixel patterns representing the densities indicated by the graphics data.

The pattern information produced by pattern generators 38 and 40 then is applied to beam logic 46 on leads 48 and 50 together with the text data from text data buffer 36 on lead 54. In beam logic 46, the text data is used to modulate the pattern information from pattern generators 38 and 40. The output of beam logic 46 is applied to acousto-optic deflector 54 and is the ray data which controls the formation of individual rays in the fine beam. The output of beam logic 46 is carried to the acousto-optic deflector 54 on lead 56. A radiant energy source 58 produces a beam of radiant energy 60 that is substantially at one wave length and that is directed to acousto-optic deflector 54. Radiant energy source 58, in the preferred embodiment, is a laser with the wave length of the beam of radiant energy 60 being chosen advantageously to discharge areas of the electrophotographic member. Acousto-optic deflector 54 modulates the beam of radiant energy 60 to provide a fine beam 62 of radiant energy comprised of a plurality of individual rays and in some cases as little as a single ray.

The fine beam 62 is directed onto an electrophotographic member 64 carried on a drum 66 rotating in the direction indicated by arrow 68. The thickness of member 64 is exagerated in FIG. 1 so that member 64 may easily be seen on the circumference of drum 66. Charging of member 64 occurs at charging station 70 prior to the time at which fine beam 62 is applied to member 64 and toning of member 64 occurs at station 72 after imaging by fine beam 62.

While the preferred purpose of the invention is to make offset lithographic plates by electrostatic techniques described herein, any use of an electrophotographic member will find advantages where a member has been imaged according to the invention.

In forming several different color separation plates, it may be desired to form text images of a single color (for example blue text) in a field of a graphics image or otherwise. Thus in the blue printing separation plate, the text image must be formed solid. On the other color separation plates that same area must be cleared so that only the color blue will be printed on the receptor. By selectively using the solid forming and clearing capabilities of the text data, one may form the solid printing blue text image in the field of graphics or otherwise as may be desired.

Figure 2:
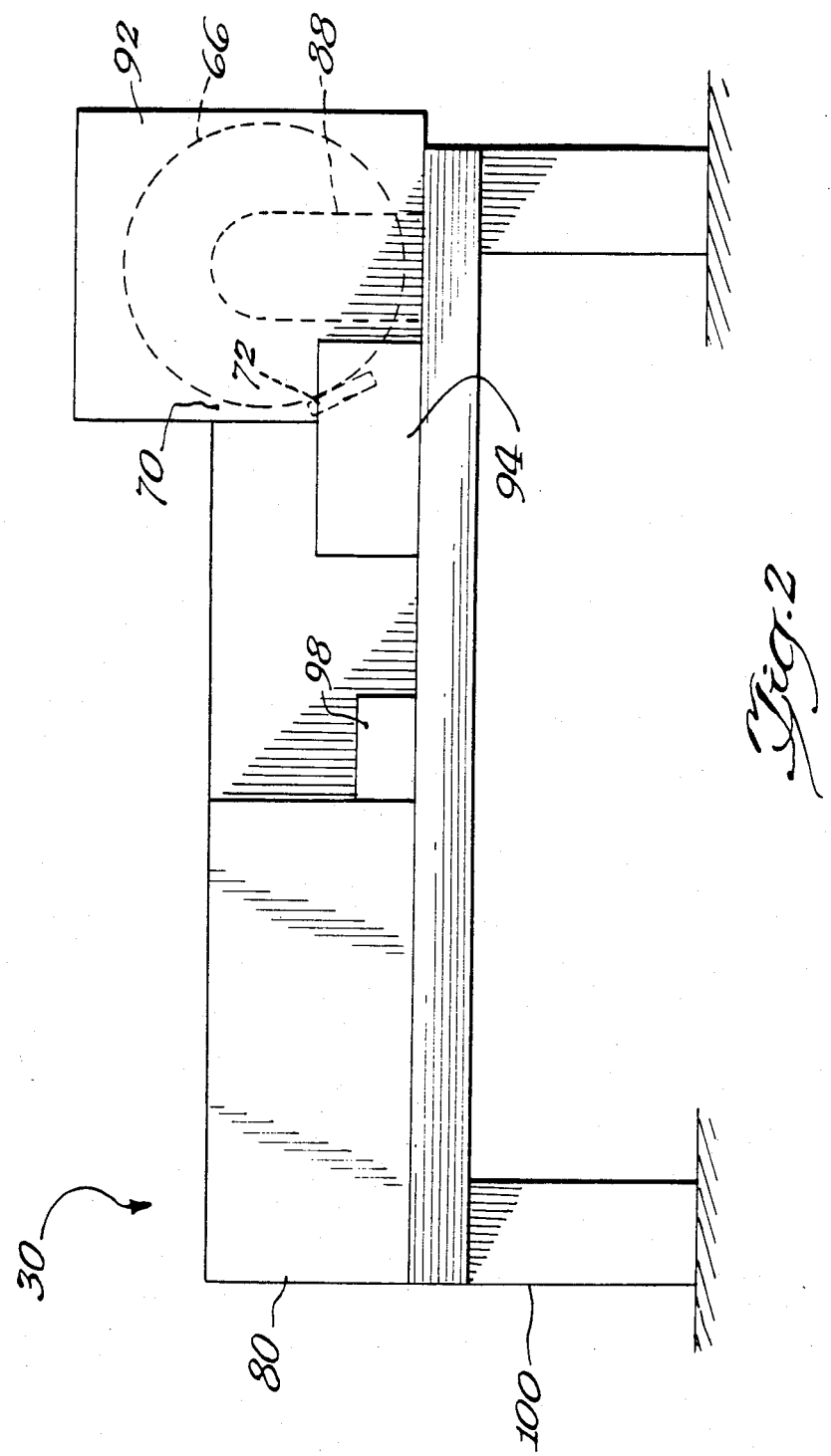
FIG. 2 is a side elevational view of the apparatus.
Figure 3:
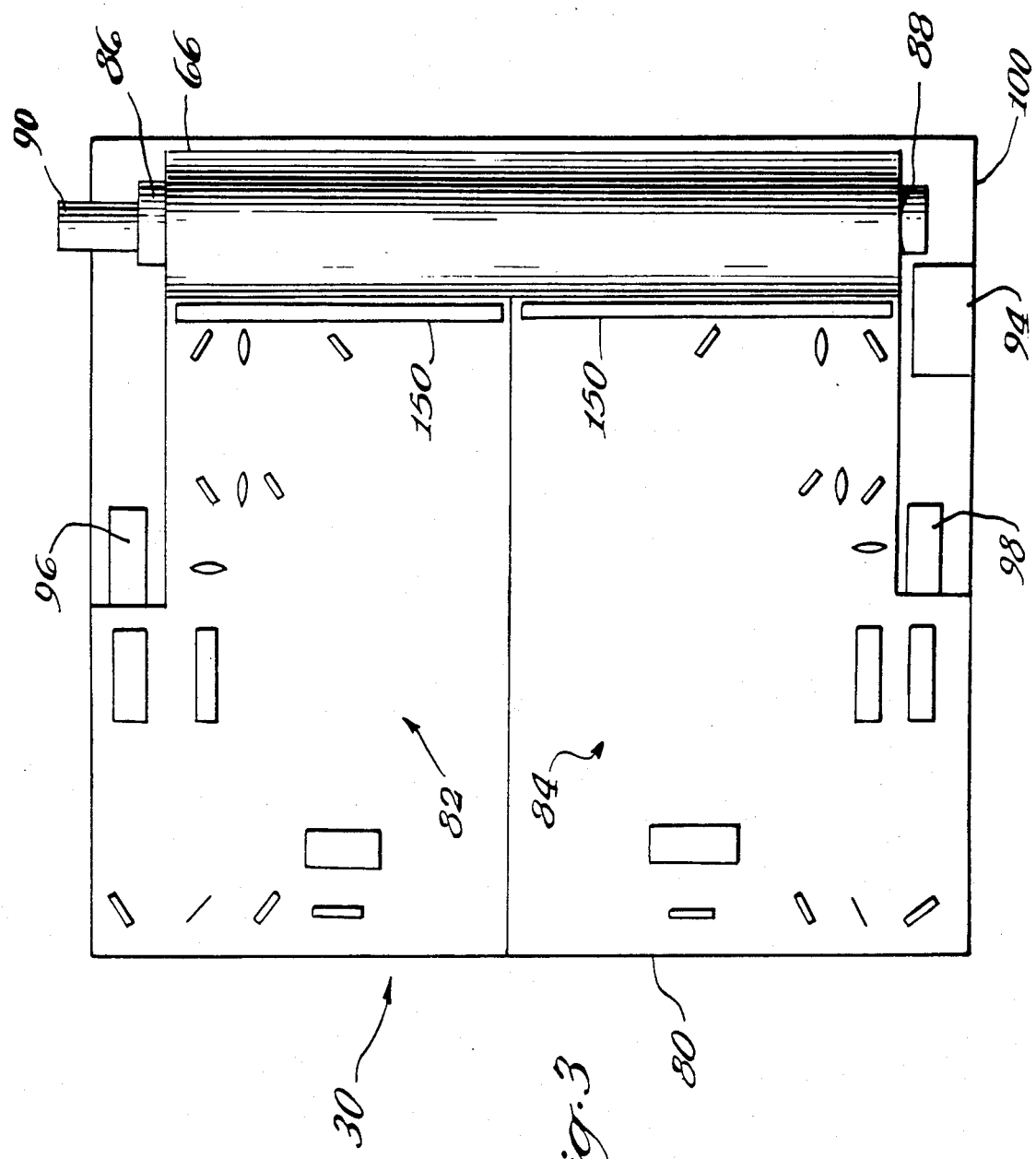
FIG. 3 is a plan view of the apparatus illustrated in FIG. 2 with the cover of the optical system and the drum removed.

Turning now to FIGS. 2 and 3, the preferred embodiment of the apparatus of the invention is illustrated including some of the cabinetry provided therewith. The apparatus 30 includes an optical cabinet 80 which encloses a left-hand optical system 82 and a right-hand optical system 84. Drum 66 extends the width of both the left-hand and right-hand optical systems 82 and 84 so that an electrophotographic member carried thereon may be simultaneously and separately imaged by the respective optical systems. Drum 66 is supported at each end by supports 86 and 88 and is rotationally driven by motor 90. In FIG. 2, the drum is shown enclosed by a housing 92 that protects an electrophotographic member carried on drum 66 from ambient light. Optical cabinet 80 and housing 92 adjoin each other, there being only a small slit opening between them through which the fine beam passes on its way to the charged electrophotographic member.

The electrophotographic member is held on drum 66 by a magnetic chuck that is formed of magnetic strips extending the length of drum 66 at the circumference thereof. The magnetic field produced by these magnetic strips is strong enough so that an electrophotographic member having a substrate of such as stainless steel will be securely held on the drum.

Alternatively, the member could be maintained in fixed relationship on the drum 66 by other hold-down systems such as vacuum systems, clamps, springs, etc.

In the preferred embodiment, the drum circumference is 1250 millimeters while the drum length is 1,100 millimeters. The drum is continuously rotated at a speed of 0.125 RPM which corresponds to 180 revolutions per day or 8 minutes per revolution. This provides a drum speed of 2.6 millimeters per second.

The center line of the charging station 70 is arranged to be 25 degrees above the image plane, while the center line of the toning station 72 is arranged to be 30 degrees below the imaging plane. This is best seen in FIG. 22.

The maximum size electrophotographic member which may be carried by the drum 66 is a member which is 1,040 millimeters by 1,040 millimeters and the area of the member which may be imaged by each of the left and right hand optical systems is about 50 centimeters axial of the drum by 70 centimeters circumferential of the drum or an area which is about 20×28 inches.

A cabinet 94 is provided for the toning system toning tanks and pumps with the hydraulic and pneumatic connections between cabinet 94 and toning station 72 not being shown in FIGS. 2 and 3 for clarity of those figures. Mounted on the exterior of cabinet 80 are two laser sources 96 and 98, which provide the radiant energy respectively to the left-hand and right-hand optical systems 82 and 84. The entire apparatus 30 is supported by a frame 100 having the general configuration of a table. Auxiliary equipment for operating the apparatus 30 such as power supplies for the laser sources 96 and 98, servo or control electronics for the motor 90 and auxiliary tanks for the toning system may be mounted under frame 100, and are not shown in FIG. 2 for clarity or the figures.

As may be seen in FIG. 3, the left-hand and right-hand optical systems 82 and 84 are mirror images of one another.

Referring also to FIGS. 4, 5, 6 and 7, laser source 96 provides a beam of radiant energy 60 to spatial filter 110 that provides what may be termed a pinhole aperture to obtain a desired cross-sectional size of the beam. The beam 60 is transmitted through spatial filter 110 to folding mirror 112 which deflects beam 60 to beam splitter 114.

A portion of beam 60 is transmitted through beam splitter 114 and forms a reference beam 118 which is deflected by folding mirrors 120 and 122 to a spot forming lens 124. The portion of beam 60 that is deflected by beam splitter 114 is directed to acousto-optic deflector 54 that forms from beam 60 the individual rays which have been refered to as the fine beam 62. Fine beam 62 exits acousto-optic deflector 54 and passes through spot forming lens 126 and over folding mirror 128. Reference beam 118 passes through spot forming lens 124 and is deflected by folding mirror 128. After fine beam 62 passes over folding mirror 128, fine beam 62 and reference beam 118 are vertically aligned with one another through the remainder of the optical path.

Referring to FIG. 5, reference beam 118 as it is transmitted through beam splitter 114 is represented by crossed lines indicating the light in reference beam 118 is exiting the drawing figure. Folding mirror 128 is shown in FIG. 5 located below fine beam 62 after fine beam 62 passes through spot forming lens 126. The dotted circle at the center of folding mirror 128 represents that reference beam 118 is directed into drawing FIG. 5. Fine beam 62 and reference beam 118 then are deflected by folding mirror 130 with the crossed lines on folding mirror 130 indicating that the light is exiting from the drawing figure.

The dotted circles on folding mirror 130 in FIG. 6 indicate that the light is entering the drawing figure.

Fine beam 62 and reference beam 118 are then passed through a relay lens 132 to a folding mirror 134. Again the crossed lines on folding mirror 134 in FIG. 6 represent that the beams are exiting the drawing figure. In FIG. 7, beams 62 and 118 are deflected by folding mirror 134 through an fθ lens system 136 to a galvanometer mirror 138. Galvanometer mirror 138 is rotatably oscillated in the directions indicated by arrow 142 and directs fine beam 62 back through the fθ lens system 136 through an aperture 144 extending through the front plate 146 of cabinet 80 and then onto the charged electrophotographic member 64. Reference beam 118 is deflected by galvanometer mirror 138 back through fθ lens system 136 and onto a folding mirror 148 to an optical scale or grating system 150.

Figure 4:
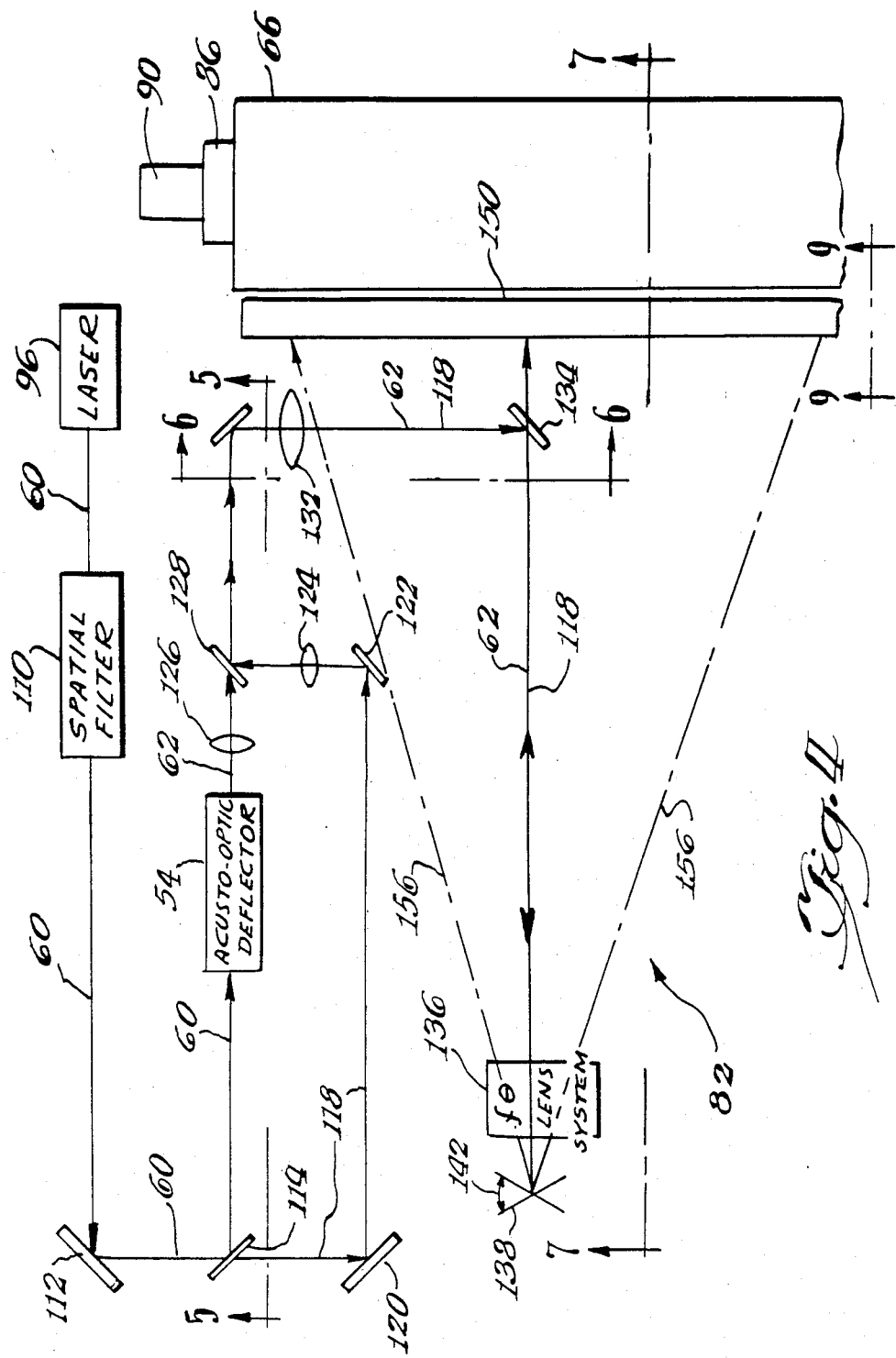
FIG. 4 is a schematic diagram of one half of the optical system of the apparatus.

It will be noted that the deflection of fine beam 62 and reference beam 118 in horizontal directions by galvanometer mirror 138 does not disturb the vertical alignment of these two beams so that the position of reference beam 118 may be sensed by the optical scale or grating system precisely to locate the position of fine beam 62 as it is used to image or write the images on the electrophotographic member 64. Galvanometer mirror 138 deflects fine beam 62 through a scan line 152 illustrated in FIG. 6 and deflects reference beam 118 along a scan line 154 lying on deflecting mirror 148. The extent to which the galvanometer mirror deflects fine beam 62 and reference beam 118 are represented in FIG. 4 by dashed lines 156.

In FIGS. 6 and 7, it will be seen that fine beam 62 and reference beam 118 are located below the imaging plane defined by fine beam 62 as it passes through aperture 144 and is directed onto electrophotographic member 64. The fθ lens system 136 provides field flattening for both fine beam 62 and reference beam 118 so that they may be maintained in focus respectively across the surface of the electrophotographic member 64 and across the surface of the optical scale or grating system 150.

The spatial filter, folding mirrors, beam splitters, spot forming lenses, relay lens and galvanometer mirror are all common optical elements which readily may be constructed and arranged in a system as has been described, as may be desired.

In the preferred embodiment the spot forming lenses have a focal length of 26 millimeters, the relay lens has a focal length of 200 millimeters and the fθ system has a focal length 870 millimeters. The distance between the spot forming lens and the relay lens is 559.2 millimeters while the distance between the relay lens and the fθ lens is 1,190 millimeters. The distance from the fθ system to the focal plane at the electrophotographic member 64 and the optical scale system 150 is 870 millimeters.

The fθ lens system 136 is illustrated in FIG. 8 and comprises elements L1 through L4 having surfaces defined by radii R1 through R8 as shown.

The lens of FIG. 8 comprises from the object end a first, negative component L1 having a concave object side surface a second, positive component L2 having a concave object side surface; a third positive component L3 having a flat object side surface; and a fourth positive component L4 having a flat object side surface and a convex image side surface.

The lens of FIG. 8 is defined substantially by the data of Table I, as scaled to a focal length of 870 millimeters;

| LENS | | Radius | Axial Distance Between Surfaces (mm) | $N_d$ | $V_d$ |
|---|---|---|---|---|---|
| L1 | R1 | −161.744 | | | |
| | | | 15.00 | 1.617 | 36.6 |
| | R2 | ∞ | 6.97 | | |
| L2 | R3 | −216.311 | | | |
| | | | 28.871 | 1.523 | 58.6 |
| | R4 | −213.119 | | | |
| | | | 0.20 | | |
| L3 | R5 | −2575.204 | | | |
| | | | 18.06 | 1.523 | 58.6 |
| | R6 | −264.288 | | | |
| | | | 0.20 | | |
| L4 | R7 | ∞ | | | |
| | | | 13.00 | 1.523 | 58.6 |
| | R8 | −265.847 | | | |

The lens disclosed may of course be scaled otherwise as it is desired.

Figure 12:
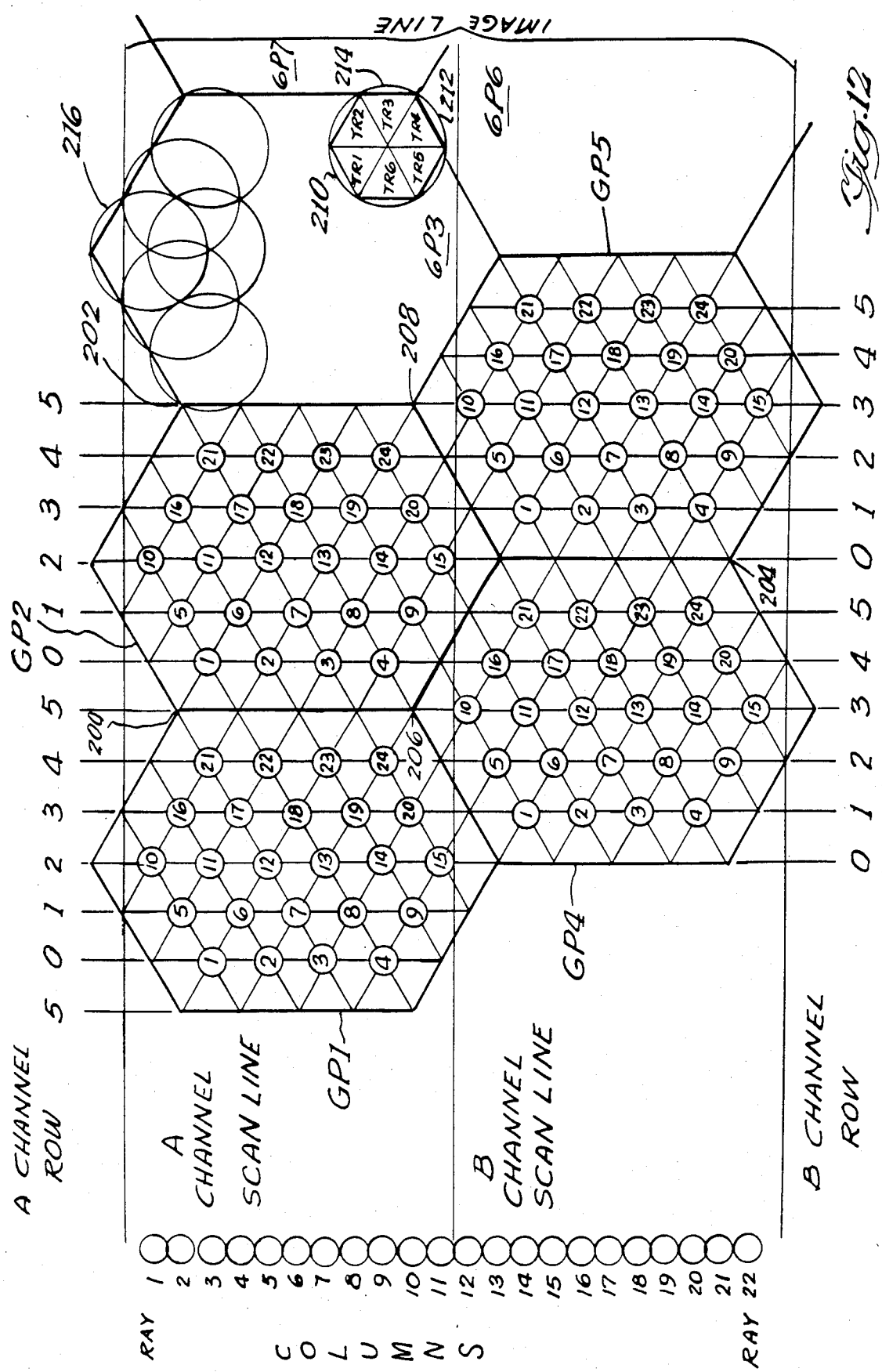
FIG. 12 is a chart of a field of graphics pixels.
Figure 13:
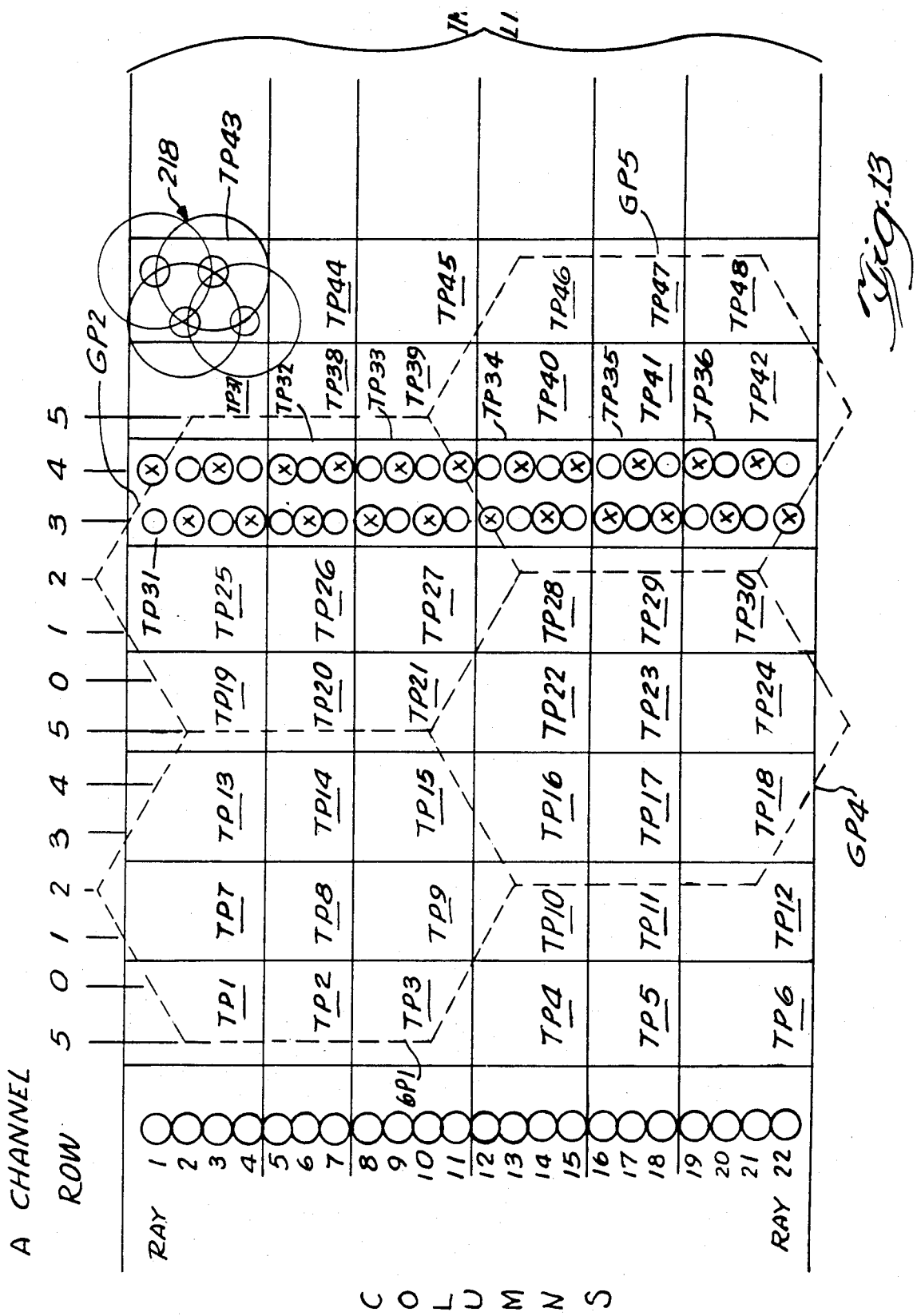
FIG. 13 is a chart of a field of text pixels overlaid with four graphics pixels.

The acousto-optic deflector 54 is capable of separating beam 60 into as many as 22 individual rays or beamlets which form fine beam 62. These 22 rays are indicated in FIGS. 12 and 13. In the preferred embodiment as many as 22 individual radio frequency signals may be applied to acousto-optic deflector 54 on lead 56 (see FIG. 1) to deflect the 22 individual rays, each radio frequency signal being capable of deflecting one individual ray. Acousto-optical deflector 54 is constructed and arranged so that the individual rays that are deflected from beam 60 are aligned vertically in fine beam 62 and so that the focused images formed on the electrophotographic member 64 are arranged adjacent and spaced equidistant from one another. Thus a radio frequency signal of the first frequency will form one individual ray while the next radio frequency signal will form an adjacent ray and so on. In the preferred embodiment acousto-optic deflector 54 is capable of deflecting 22 individual rays and although deflector 54 operates on the principle of acoustically deflecting the individual rays other deflector apparatus may be used in place thereof.

Figure 9:
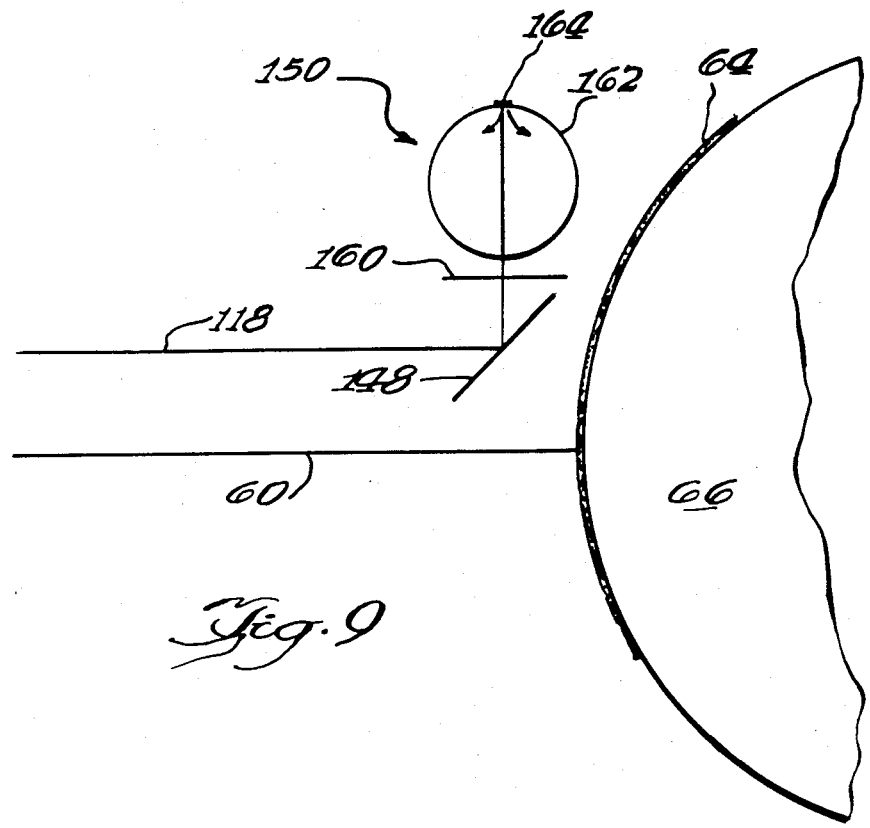
FIG. 9 is a schematic diagram of the optical scale or grating system including a bar collector illustrated in FIG. 4 taken generally along the line 9—9 and in the direction indicated.
Figure 10:
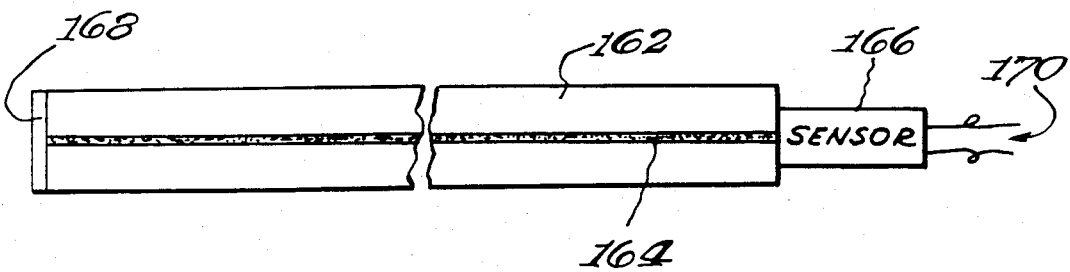
FIG. 10 is a top view of the bar collector illustrated in FIG. 9 arranged with a sensor.

In FIGS. 9 and 10, the optical scale or grating system 150 comprises a grating 160, a bar collector 162 carrying a narrow stripe of reflective material 164 on the outer surface thereof and a sensor 166 such as a photomultiplier tube. The optical scale or grating system 150 extends the entire length of the scan lines across which fine beam 62 and reference beam 118 are deflected, see FIG. 4, as do grating 160 and bar collector 162.

Grating 160 is an elongate transparent member carrying alternating opaque and transparent lines or spaces having a frequency related to the frequency of the rows in an imaging line. Grating 160 is arranged so that reference beam 118 is deflected across the opaque or transparent areas or lines on every imaging line.

Bar collector 162 is an elongate cylindrical member which extends the length of grating 160 and is arranged relative to grating 160 so that when reference beam 118 passes through grating 160, reference beam 118 passes through the diameter of bar collector 162 to strike transparent material 164. When reference beam 118 strikes reflective material 164, a lambertion distribution of the scattering or reflecting light occurs in the bar collector 162 and the light so entering bar collector 162 remains therein and is transmitted to the end of bar collector 162 where it is sensed by sensor 166. As shown in FIG. 10, the end of bar collect 162 opposite sensor 166 carries a mirror 168 thereon or has a mirrored surface to reflect light along the length of the collector to the sensor 166. Sensor 166 provides an analog electrical signal on leads 170 that indicates reference beam 118 entering the bar collector 162.

In the preferred embodiment bar collector 162 has a diameter of 1.75 inches and is made of such as acrylic materials although the material known under the trademark of Lucite has provided good results. The narrow stripe of reflective material 164 may be any highly reflective material and in the preferred embodiment a typewriter correction fluid is used. The length of the bar collector 162 is about 24 inches to provide the desired 20 inch imaging line plus sufficient length for housekeeping and related needs.

In evaluating the glass fiber technique used herein for the bar collector 162 it was discovered that by placing a strip of masking tape along the length of bar collector 162 opposite the point of entry of reference beam 118 that a significant increase in the energy transmitted by bar collector 162 to sensor 166 was obtained. The increased energy level from the nonreflecting surface of the tape was immediately recognized to be the result of eliminating twice the area-gap index of refraction (a high loss component) while containing and rereflecting the trapped energy beam. It was quickly determined that a highly reflective material such as typewriter correction fluid applied to the rod's cylindrical surface would be highly efficient in preventing the transmissive loss and aid in providing good lambertion distribution of reference beam 118 striking the same. Further investigation showed that it was necessary to coat only a stripe about ¼ of an inch wide along the length of the rod to provide more than adequate energy for the sensor 166. Best results for 24 inch long rods indicated that the best energy response was obtained by using a rod diameter of from 1.5 inches to 1.75 inches.

In the preferred embodiment the grating 160 has a three hundred line per inch optical scale to provide the signals from sensor 166 to locate the position of fine beam 60 along electrophotographic member 64.

It is important that the sensor 166 not look at the entire cross-section of the end of the collector tube 162, but only at a smaller area centered around the longitudinal axis of a bar collector 162. It also is important that only the single narrow stripe of reflective material 164 be on the circumference of the bar and the remainder of the circumference of the bar be clean to maximize the internal reflection of light in the bar. The leads 170 from the sensor 166 in the preferred embodiment are connected to an automatic gain control amplifier to smooth out the signal from the bar collector 162 in response to beam 118 entering the collector at different distances from the sensor. In the preferred embodiment the signal from the automatic amplifier is used in a phase-locked-loop circuit to provide the desired signals indicating the location of a fine beam 62 along the imaging lines on the member 64.

It is important that the reference beam 118 present a focused image across the entire length of grating 160 so that the signals provided from sensor 166 will be well defined. If the reference beam presents focused images that are off the plane of grating 160, the edges of the pulses generated from sensor 166 will not be well defined and the location of fine beam 62 along the imaging lines will not be precise.

As has been stated digital data that is input to the apparatus is in the form of graphics data and text data. The graphics data is used to reproduce graphic images on the electrophotographic member 64 with one black and white image or one color separation image being formed on each member.

The graphics data is in the form of binary digital words with the value of each word representing a scaled areal density to be formed on an imaging area on the member. Each word is used to select a pattern of elements from a memory or other storage device which represents the scaled (gray scale) density equal to the value of the graphics digital word.

The patterns selected from the memory are formed on the member by discharging and leaving charged elements in an imaging area. The elements are arranged equispaced across the surface of the member and are arranged in rows and columns. Selective elements in the imaging areas are used to form the patterns and in the preferred embodiments the elements are grouped together in irregular hexagonal picture elements or pixels. It should be remembered that the configuration of the pixels is a choice of the designer, the imaging areas in which the configurations may be formed being of a predetermined number of rows and of a predetermined number of columns. One pattern then may be formed in one pixel The columns at which the elements are located are defined by the horizontal lines across the member that would be described by the individual rays or beamlets of the fine beam 62 as they are passed across an imaging line. The rows of the imaging lines perpendicular to the columns and are defined by the sample clock signals produced from the grating system 150.

The imaging lines are comprised of two scan lines of graphics pixels with each scan line of graphics pixels being controlled by one graphics data channel. Thus channel A graphics data controls the graphics pixels to be formed in scan line A, and the graphics data in channel B controls the graphics pixels to be formed in scan line B.

It bears repeating that if the text data contains no information to be formed on the electrophotographic member 64, the graphics data is formated so that the graphics image or images contained therein will be formed on the member 64 while the remainder of the surface of member 64 will be discharged. Thus, the printing plate formed by such graphics and text data will print on the receptor only the graphics image or images and leave a clear background.

The text data is used to reproduce text images and line graphics such as charts and graphs on member 64. While the graphics data provides for the scaled density of the imaging areas to be formed on member 64, the text data is used to provide binary imaging or image areas of the member 64 which in the preferred embodiment are the same as text pixels.

In the preferred embodiment the text pixels have a definite relationship to the graphics pixels.

In every imaging line the text pixels are aligned six abreast along each row and are two rows wide. Specifically, what may be called the first text pixel or scan line covers the area defined by the first four columns of individual rays by two rows deep. The next text pixel is three columns wide by the same two rows deep. The next two text pixels are each four columns wide and the same two rows deep. The next text pixel is three columns wide and the same two rows deep, and the last text pixel is four columns wide by the same two rows deep. Thus, it may be said that the text pixels are arranged across the imaging line at every two rows.

Every word of the text data represents the binary image to be formed in the text pixels formed along the same two rows of the image line.

For each of the six text pixels in those two rows, there are four possible states or conditions. The first two states are defined as being the normal mode, the first state or condition or which will inhibit the formation of rays of fine beam 62 to discharge areas of the member 62. These charged areas will form solid printing areas that will print such as black ink on a white background. The second state or condition will enable the formation of individual rays of fine beam 62 as determined by the graphics data for that row. The last two states are defined as being the reverse mode. The first condition of the reverse mode or third state causes a formation of rays of fine beam 62 to discharge areas of the member 64. These discharged areas will then form text images in areas otherwise formed of graphics images to provide printing plates which print clear text in graphics images. The second condition of the reverse mode or fourth state enables the formation of rays under control of the graphics data.

These four states are formed of the binary combination of a control bit and one data bit of every word of the text data. Thus, as will be explained hereinafter, one data bit and one control bit of every word controls inhibiting of the formation of rays, enabling of formation of rays by the graphics data or causes the formation of rays in every text pixel.

If the graphics data is a nullity and is used only to clear the entire plate, then the information contained in the text data will be able to form text images only by inhibiting the formation of rays to leave charged areas which will print solid on the receptor. This is the first state or condition under the normal mode. It will be noted that text images will not be able to be formed by the first condition of the reverse mode or the third state which causes the formation of rays because the graphics data is clearing the plate and there will be no background against which to form the clear text images.

If the graphics data is full density for the entire plate, no rays will be formed anywhere across the plate by the graphics data. In such a case, the only text images which may be formed are under the reverse mode first condition or third state which which causes the formation of the rays to discharge areas in an undischarged field to print clear in a field of solid printing area. It will be noted that in such a case the first state or condition of the normal mode has no effect to create or form a text image by inhibiting the formation of rays because there are no rays being formed by the graphics data.

Thus, the relationship between the graphics and text data may be described as one where the graphics data is able to form graphics images across the entire imaging area of the member 64 and depending upon the graphics images so formed the text data may form text images. Moreover, the graphics data and the text data contain enough information to image the entire imaging area of member 64 with the formation of patterns in the graphics pixels and the formation of the text pixels being independent of one another. Imaging the graphics and text in this matter has advantages in that different imaging schemes for the graphics may be implemented without interfering between the relationship between the graphics and text imaging.

Figure 11:
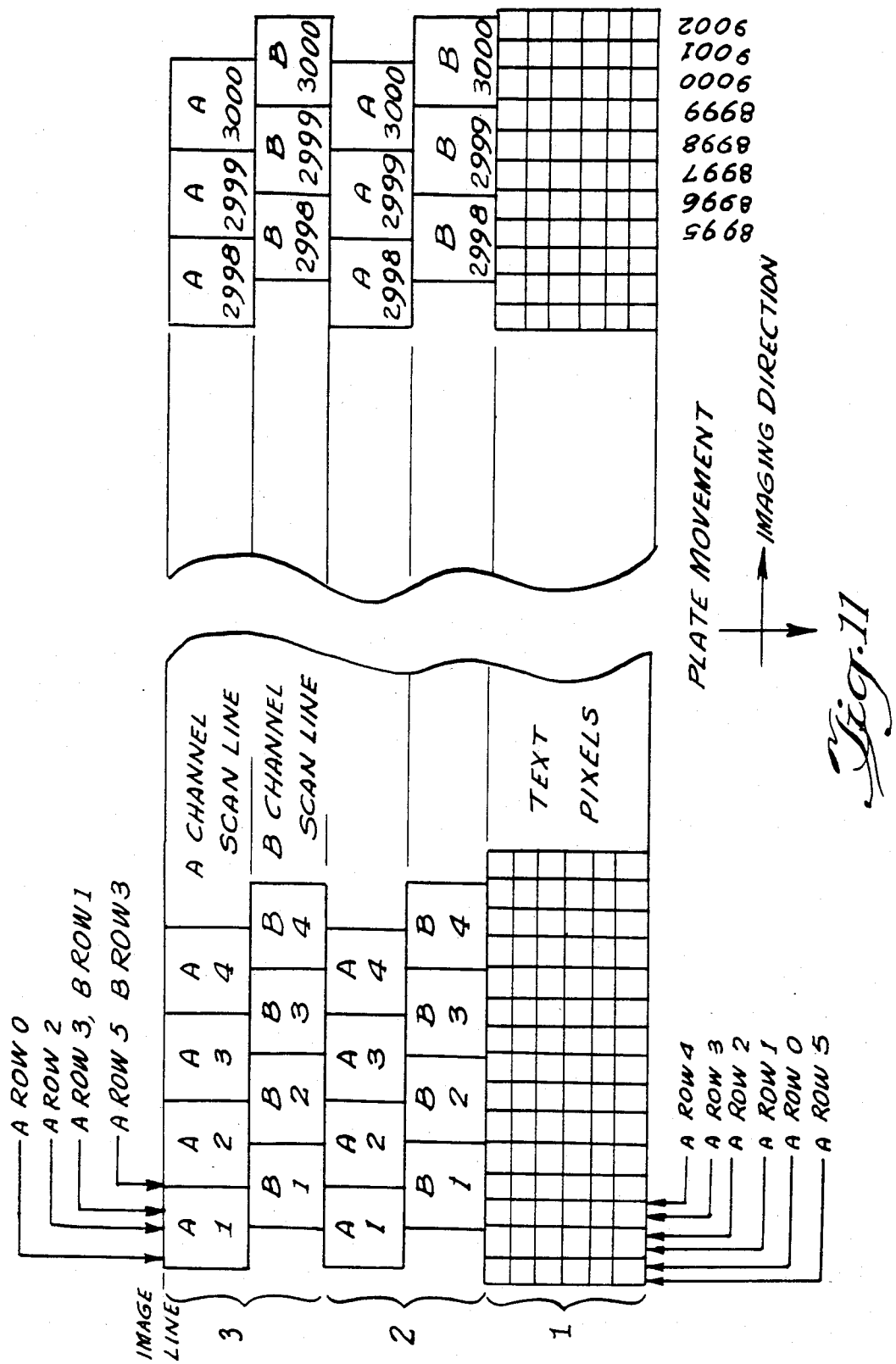
FIG. 11 is a chart of a field of graphics image areas and text pixels.

Referring now to FIGS. 11, 12 and 13, there is illustrated in FIG. 11 a chart of three imaging lines which are formed on the electrophotographic member 64. Imaging lines 1 and 2 illustrate the formation of graphics pixels while image line 3 illustrates the formation of text pixels. All three image lines represent the extent of imaging that may be performed by each of the left- and right-hand optical systems 82 and 84 on its respective one half of the member 64.

Image lines 1 and 2 each comprise an A-channel scan line and a B-channel scan line, there being three thousand (3,000) image positions in each of the A-channel and B-channel scan lines with the imaging positions in the B-channel scan lines being offset relative to the imaging positions in the A-channel scan lines. Thus, in each of image lines 1 and 2, there are 6,000 graphics pixels which may be formed.

It will be remembered that the imagable area across the width of the member 64 is about 40 inches so that the left and right-hand optical systems 82 and 84 each image a width of about 20 inches. Dividing 20 inches into the 3,000 image positions of each channel in an image line results in a frequency of about 150 positions per inch or about 6 image positions or graphics pixels per millimeter. This provides a 150 line per inch resolution commonly desired in the printing industry.

Referring now to FIG. 12, there is depicted a field of graphics pixels that may be presumed to be laid out on the surface of the electrophotographic member 64. The pixels are irregular hexagonal areas designated GP1, GP2, GP3, GP4, GP5, GP6 and GP7 inclusive and are parts of an overall pattern of hexagons which cover the surface of member 64. Obviously, the defining lines illustrated in FIGS. 11, 12 and 13 are imaginary and merely represent a theoretical geometric pattern which for convenience describes the manner in which the imaging is effected.

The individual rays of fine beam 62 are going to remove charge from the areas of the charged member to form elements of the graphics pixels. The possibility for removal is represented in this case by elements of discharge which are generally circular and which account for the entire interior of each graphics pixel. The graphics pixels according to the invention are arranged in interleaved columns so that the field of pixels may be considered to occupy all of the area. Graphics pixels GP1, GP2 and GP3 are shown with their flat sides respectively in common at 200 and 202 while the flat sides of graphics pixels GP4 and GP5 are in common at 204. The adjoining pixels to the left and to the right of these pixels are also arranged in this way. The graphics pixels in adjacent scan lines are interleaved or staggered relative to one another; hence, pixels GP4 and GP5 have their top apices at the location of the common flat sides 200 and 202 of pixels GP1, GP2 and GP3 as indicated in FIG. 11 for adjoining scan lines.

Graphics pixels GP1, GP2, GP4 and GP5 have centering points laid out in them that are numbered and that can be seen to be formed at the junctures of rows and columns that are marked above and to the left of the field of pixels. The columns are defined as imaginary lines described by each of the individual rays of fine beam 62 as fine beam 62 is swept across the image line. The rows are defined along the image line by clock pulses from the optical grating system 150 and occur at equidistant intervals along every image line.

In the preferred embodiment, the image positions illustrated in FIG. 11 are defined as having six rows numbered 0–5 and 11 columns. Scan line A is formed of columns 1–11 while scan line B is formed of columns 12 through 22, the column numbers corresponding to the number of the individual rays. While the graphic pixels GP1 through GP5 in the preferred embodiment have been defined as irregular hexagons having the number of elements illustrated, the graphics pixels may be defined as having any geometric configuration desired which fits the limitations of the six rows and eleven columns. As will be described more fully hereinafter concerning the electronics, the limitations of six rows and eleven columns is purely one of electronics such that by modifying the electronics any number of columns and rows may be defined to be an imaged area and in turn any geometric configuration desired may be formed therein.

In the preferred embodiment there are 24 centering points for the elements in each graphics pixel and these are arranged in eleven horizontal columns and six vertical rows. The columns are all confined within each graphics pixel between its top and bottom apices. All graphics pixels are considered to be oriented exactly the same with their long flat surfaces left and right and apices top and bottom. The rows are arranged somewhat differently. Five of the rows will have centering points that are within the confines of the graphics pixel between left and right flat sides, while the sixth row image will never have centering points located thereon and is coincident with the left and right flat sides of the graphics pixels. This is a spacing expedient to be explained later.

The centering points which have been described are the centers of the circular dischargable or formable elements such as 210 which are going to be discharged by the individual rays. As seen, the circular element 210, which is the same as all others, is large enough so that in addition to covering a certain area within its graphics pixel it overlaps into the adjoining pixel. Thus, the circular element 210 not only discharges the area within the graphics pixel GP3 that it encompasses but also discharges a cordal slice or segment in each of the graphics pixels GP6 and GP7 as indicated at 212 and 214, respectively.

If we drew a line between each of the centering points vertically and diagonally, we would see the overall patterns of general hexagonal area which can be seen in the pixels GP1, GP2, GP4, GP5 and of course these hexagons have the appearance that they are made up of a plurality of equilateral triangles. Thus, the circular discharge elements such as 210 will discharge the area around its centering point comprised of the six equilateral triangles surrounding that centering point plus six more cordal segments beyond that hexagon defined by those triangles. And since every other circular element will also discharge the photoconductive surface of the electrophotographic member in the same way, the discharged circular elements that are side by side always overlap.

Graphics pixel GP3 has six of the top circular elements shown in outline at 216 and there, overlapped areas are readily ascertained. In addition, there can be seen the 8 overlapped cordal segments of discharge area that protrude into adjoining pixels including the pixels GP2 and GP7. For explanatory purposes, the total discharged area of any graphics pixel can ba approximated by the triangles which are included in the circular elements discharged. The more circular elements of discharge in a given graphics pixel, the better the approximation because of the overlap within the graphics pixel. In the circular element 210 the equilateral triangles are identified as TR1 to TR6 inclusive.

It is illustrated in each of graphics pixels GP1 and GP4 that in the horizontal columns there is only one centering point in each of columns 1, 11, 12, and 22; two centering points in each of columns 2,4,6,8,10,13, 15, 17, 19 and 21; and three points in each of columns, 3, 5, 7, 9,14, 16, 18 and 20. These conditions are requirements of the electronics and may be altered by altering the electronics as is desired. These conditions must be met during the laying down of the discharge elements.

The fine beam 62 which makes one pass to provide the horizontal column information for generation of the centering points for the graphics pixels that are being described in an image line, will be composed of a maximum of 22 individual rays passing over the image line. It is assumed that all rays will be used for the graphics pixels in an image line but the maximum number of rays or beamlets that will be operating at any given time for the configuration illustrated in FIG. 12 will be 9, because as is illustrated in FIG. 12 there are no more than 9 centering points along any one row. This is shown in graphics pixels GP2 and GP4, at scan line A rows 0 and 1 and scan line B rows 4 and 5. Along scan line A row 0 and scan line B row 4, centering points 1, 2, 3 and 4 of graphics pixel GP2 are defined, while centering points 16, 17, 18, 19 and 20 of graphics pixel GP4 are defined. Of course, the minimum number of rays or beamlets operating will be zero.

Summarizing then, the horizontal columns of centering points are controlled by the number of individual rays in a fine beam 62. The rows are controlled by the information that is obtained from the optical grating system 150. The row information is used in the beam logic electronics to discharge the desired elements as will be described hereinafter. The patterns that are imaged in the graphics pixels in response to the density values indicated by the digital words of the graphics data may be of any configuration desired to represent the equivalent density and in the preferred embodiment, there is one predetermined pattern which is to be formed in the graphics pixel for every density value indicated by the graphics data.

In the preferred embodiment the distance between the center lines of scan line A and scan line B is 169.3 microns while the distance between the flat sides of each graphics pixel is 171.7 microns. The diameter of each of the discharged elements is 35 microns with all of these values being based upon a 150 line per inch resolution.

It will be noted that as there are 24 individual elements in each graphics pixel that may be either charged or discharged. This results in a total of $2^{24}$ or approximately 16 million combinations of discharge elements which are available to image the desired density patterns. Thus, even if the graphics data may only represent 256 steps of density with 8 bits of information per graphics digital word, each step of the 256 step gray scale may be represented by a plurality of the 16 million available patterns which have density values equal to or approximately equal thereto.

The text pixels which are formed in response to the text data are illustrated in FIGS. 11 and 13. In FIG. 11, image line 3 has six scan lines of text pixels. The text pixels are arranged 3 wide for every graphics data scan line and are two rows deep. The arrangement of the text pixels relative to the graphics pixels and the rows and columns described hereinabale is illustrated in FIG. 13.

The text pixels are arranged slightly shifted in relation to the graphics pixels, and there are about 9 text pixels per graphics pixels or graphics image area. Referring to FIG. 11, along one image line there are 9,002 rows of text pixels with six text pixels per row. The 9,002 rows of text pixels results by multiplying the 3,000 graphics pixel per scan line for each of the left- and right-hand optical systems 82 and 84 by 3 rows of text pixels per graphics pixel plus two additional rows of text pixels required to cover the area uncovered by the shift in position of the channel A and channel B graphics pixels.

The relationship of the text pixels to the graphics pixels in the A channel scan line and B channel scan line is illustrated in both FIGS. 11 and 13. The relationship of the text pixels to the columns defined by the individual rays is illustrated in FIG. 13.

FIG. 13 illustrates text pixels TP1–TP48 arranged along one image line and illustrates in dashed lines the relationship thereto of graphics pixels GP1, GP2, GP4 and GP5. The electronics of the digital platemaker system are arranged so that each word of the text data received thereby operates on one row of text pixels that are six abreast. Thus, successive words of the text data operate on respective text pixels TP1–TP6, TP7–TP12, TP13–through TP18, etc.

Each text pixel is defined as being that area which encloses a certain number of discharge elements which are formable by certain rays of the fine beam 62 across two successive graphics channels. By reference to FIG. 12 it will be seen that the rows indicated at the top of FIG. 13 correspond to the rows indicated at the top of FIG. 12. The areas enclosed by the text pixels with reference to the formable discharge elements are illustrated in FIG. 13 where for example, text pixel TP-31 is formed of the area including the elements formed by rays 1, 2, 3 and 4 in the graphics A channel, rows 3 and 4. Text pixel TP-32 is formed of the area including the elements formed by rays 5, 6 and 7 in the same rows 3 and 4. Text pixel TP-33 is formed of the area including the elements formed by rays 8, 9, 10 and 11 in the same rows 3 and 4. Text pixel TP-34 is formed of the area including the elements formed by rays 12, 13, 14 and 15 in the same rows 3 and 4. Text pixel TP-35 is formed of the area including the elements which are formed by rays 16, 17 and 18 in the same rows 3 and 4. And text pixel TP-36 is formed of the area including the elements formed by rays 19, 20, 21 and 22 in the same rows 3 and 4.

Every text pixel of the field of text pixels across the entire imaging area of the member 64, of which the text pixels TP1–TP48 illustrated in FIG. 13 are representative, may be operated on in one of four ways, as has been described hereinbefore. These four ways result from the binary combination of one information bit and one control bit of each digital word of the text data. These four states or conditions are divided into two modes, the normal mode and the reverse mode. In the normal mode the text data may inhibit the formation of rays in any text pixel, this results in leaving the area of that particular text pixel charged, so that it will be toned and will print solid upon a receptor. The second state of the normal mode is where the text data enables the formation of rays under control of the graphic data. The first condition of the reverse mode or third state causes the formation of rays in the area of a text pixel to form a clear text image in a field of a graphics image. On the receptor then, the text will be clear within the field or confines of the printed image. The second condition of the reverse mode or the fourth state where the text data enables the formation of rays under control of the graphics data to produce a graphics image represented thereby.

It therefore may readily be seen that the second conditions of the normal and reverse mode simply allow the formation of the graphics image carried by the graphics data. The first condition of the normal mode inhibits the formation of any rays or discharge elements in the entire area of the text pixels, and the first condition of the reverse mode causes the formation of rays or discharge elements in a text pixel. The member 64 may be imaged with text data to obtain a resolution which is three times finer than that obtainable using the graphics pixels. Further, the text and graphics data does not have to be specially formated; nor does the electronics have to be construed or arranged to switch back and forth between the text and graphics data.

In a manner similar to the predefined positions of the discharge elements of the graphics pixels, there are predetermined centering points or positions for the discharge of elements in the text pixels. It may readily be ascertained by viewing FIG. 13 that not all of the formable elements in a text pixel need be formed or discharged to clear the total area of a text pixel during the first condition of the reverse mode, only half of the formable elements need actually be formed with the overlap clearing areas of the unformed elements. In fact, it may be observed in FIG. 13 that only half of the dischargable elements in any one text pixel need be discharged to discharge the entire area of that text pixel. This is illustrated in text pixel TP-43 wherein there are four discharged elements represented by the four circles 218. Thus, it may be ascertained that by discharging the elements whose centering points have an x or crossed line, as is illustrated in text pixels TP31–TP36, the entire areas of those text pixels may be discharged. Thus, it may be seen in the reverse mode, in the condition which causes the formation of rays to discharge the areas of the text pixels, only every other ray need be formed in any one row of dischargable elements, while in the next successive row only those elements which were not formed in the preceeding row need be formed. Thus, in text pixel TP31, rays 2 and 4 are formed in row 3 while rays 1 and 3 are formed in row 4. Thus, to perform the reverse mode function which causes the formation of rays to discharge elements of the text pixel, the electronics need only form alternating rays in alternating rows. The formation of these rays in the reverse mode then may be described as text reverse mode odd and text reverse mode even, the odd and even referring to the desired rays which are to be formed in the even numbered rows and the rays which are to be formed in the odd numbered rows. The implementation of this odd and even arrangement will be discussed more fully hereinafter in conjunction with the electronics.

The text data is used to form solid printing areas such as for alphanumerics on a receptor and further may be used to print on a receptor line graphics such as engineering drawings, charts, graphics, etc.

There are two sets of electronic systems for the apparatus of the invention, each electronic system being dedicated and acting in conjuction with only the left- or right-hand optical system. The electronics system is required to receive graphics and text data and apply radio frequency signals to the acousto-optic deflector 54, which discharges incremental areas on the electrophotographic member 64. Both electronics systems perform the same functions and are identical to each other in all respects so that a description of one electronic system is a description of the other electronic system, and reference to an electronic system in conjunction with the modulation of the laser beam refers to electronic systems of the left- and right-hand optical systems.

The electronics system illustrated in FIG. 1 generally illustrates the operation of both the electronic systems while the electronics system illustrated in FIG. 14 is a more detailed illustration of the same.

Data is input to the electronics system on input leads 250, which are illustrated with arrows having a substantial width to illustrate that the input data is comprised of digital words having several parallel bits conveying the desired information. In the preferred embodiment the data is input to graphics data buffers 32 and 34 and text data buffers 36 sequentially, that is to say that buffer 32 is loaded first, buffer 34 is loaded next and then buffer 36 is loaded last. The data contained in each buffer is the information or density values required to form graphics pixels along one scan line and the information required to form text pixels across an entire image line. Inputting of the data to the buffers 32, 34 and 36 may be under control of such as a central controller 252 by way of leads 254. Central controller 252 may be interfaced with whatever system that the text and graphics data are supplied from and may take the form of a hard wired controller or a programmable controller as is desired. In the preferred embodiment, central controller 252 is a programmable microprocessor.

During an initialization period before the actual text and graphics data are input to the apparatus, the patterns that are to be selected by the graphics data are loaded into the pattern generators 38 and 40 by way of input lead 250 under control of central controller 252. In this initialization period, data in form of the patterns that are to be loaded in the generators 38 and 40 are input into buffers 32 and 34 and are carried on leads 42 and 44, and leads 256 and 258 to the inputs of pattern generators 38 and 40 indicated by arrow heads 260 and 262. Thus, it may be determined that pattern generators 38 and 40 comprise memory devices that may be written into, such devices being called random access memories or RAM. Loading of the pattern generators 38 and 40 is under control of central controller 252 by way of lead or leads 264. Gating is provied that will be described hereinafter so that the graphics data carried by leads 42 and 44 to pattern generators 38 and 40 will not interfere with the patterns output by generators 38 and 40. After the initialization period has been completed and all the patterns are loaded into the pattern generators, the operational period of the imaging cycle is commenced in which the pattern generators become output devices.

Generation of the patterns is in response to graphics data applied to pattern generators 38 and 40 by way of leads 42 and 44. Control of the generation of patterns and inidcation of the location of fine beam 62 along the scanning line occurs by way of leads 264 from central controller 252. Central controller 252 is connected to optical grating system 150 by way of leads 266.

The output of pattern generators 38 and 40 are applied on leads 48 and 50 to beam logic 46 which also has text data applied thereto over leads 52. Control of the beam logic 46 including indication of the position of fine beam 62 along the scan line is from central controller 252 over leads 268.

In the beam logic 46 the modulation of the graphics patterns to be formed at the individual rows are modulated by the text data as has been described hereinbefore with the output of the beam logic on leads 56 comprising the radio frequency signals required to produce the image indicated by the combination of the text and graphics data. Generation of the fine beam 62 and reference beam 118 is as has been previously described and therefore need not be redescribed. It suffices to say that optical path 270 illustrated in FIG. 14 generally comprises the optical elements between the acousto-optic deflector 54, the electrophotographic member 64 and the optical grating system 150.

Turning now to FIG. 15, the pattern generators 38 and 40 are more specifically shown as is the gating required to load pattern generators 38 and 40 during the initial period. Latching line driver 280 is applied with data on leads 256, which in FIG. 15 is represented by a single line for clarity of the drawing. During the initial period in which patterns are loaded into pattern generator 38, the latching line driver 280 under control of leads 282 passes the data on leads 256 therethrough to be input by channel A pattern RAM 284 which is placed in the read mode by lead 286. In a like manner, data which is supplied on leads 258 is applied to latching line driver 286. During the initial period, the data passes therethrough and is input by channel B pattern RAM 288. Channel B pattern RAM is placed in the read mode also by lead 286. At the end of the initial period and at the commencement of the operation of the imaging cycle, latching line drivers 280 and 286 have their outputs placed in a tri-state or high impedance level that places no load on leads 260, 48, 50 and 262. Thus, in the operational period the data appearing on leads 48 and 50 will be only the outputs of pattern RAMS 284 and 288.

During the operational period, graphics data is supplied to pattern generators 38 and 40 by way of leads 42 and 44. The graphics data is input to channel A latching counter 290 and channel B latching counter 292, respectively, in the form of parallel words having 8 bits of information each. The outputs of each of latching counters 290 and 292 are 11 bits of information the 8 most significant bits of the output being the same as the graphics data input thereto and the three least significant bits being generated in response to clock signals from the optical grating system. Loading of latching counters 290 and 282 is under control of a load lead 294.

To understand the selection of the patterns from the pattern RAMs 284 and 288, it must be understood that the value carried by each graphics data word represents a scaled density of an incremental area which is to be produced or reproduced on member 64. It further will be remembered as is illustrated in FIGS. 12 and 13, the graphics pixels have a pattern produced in five sequential rows, the sixth row being used to space between graphics pixels. Thus to form one pattern in a graphics pixel, information must be applied to the acousto-optic deflector 54 one row at a time to form the individual rays or beamlets required to discharge the elemental areas and produce the pattern indicated by the pattern RAMS 284 and 288. In the preferred embodiment, this generation of the patterns across the five rows of the graphics pixels occurs by using the value of the graphics words to select a group of addresses in the pattern RAMS 284 and 288. Then, a row clock signal produced from the signals produced by the optical grating system 150 is used to clock or step through the selected group of addresses. The outputs of the pattern RAMS 284 and 288 at each step of the group of addresses then are the binary indications of whether an individual ray is to be formed or not. Simply stated, the graphics words are used to select a group of memory locations while a row clock is used to step through the locations. The outputs of the pattern RAMS, step by step, is the information needed to turn on or off the individual rays in fine beam 62.

The inputs to latching counters 290 and 292 are indicated as graphics data bits GD1-GD8. The outputs of latching counters 290 and 292 and the inputs to pattern RAMS 284 and 288 respectively are indicated as A-channel address leads AA0 through AA10 and B channel address leads BA0 through BA10. The output of pattern RAMs 284 and 288 are indicated as being pattern bits pb1 through pb11, and pb12 through pb22. The row clock signals for latching counters 290 and 292 respectively are applied on leads 296 and 298.

The least significant input bits 300 and 302, respectively, of latching counters 290 and 292 are tied to ground. When counters 290 and 292 are loaded with data by the signal on lead 294, the outputs AA0 to AA2 and BA0 and BA2 are at zero logic levels. Thus, when row clock signals are applied on leads 296 and 298, latching counters 290 and 292 respectively count up in binary manner from 0. Referring back to FIGS. 11, 12 and 13, the rows are numbered as binary numbers from 0 to 5, which corresponds respectively to the counts produced at the outputs of latching counters 290 and 292. The rows for the A and B channels of graphics data are shifted relative to one another to form the desired irregular hexagons having apices interleaved between one another. The clocking of the channel A latching counter 290 thus commences earlier than the clocking of the channel B latching counter 292 to provide the patterns from the respective RAMS at the proper times.

The leads 282, 286, 294, 296 and 298 used to control the functions of the latching line drivers and pattern generators generally are the leads 264 indicated earlier in FIG. 14 coming from central controller 252.

In FIG. 16, there is illustrated in more detail the beam logic 46. Pattern bits pb1-pb22 are applied to a 22 bit one-of-four multiplexer 304 on leads 48 and 50.

While multiplexer 304 is indicated as being one unit, which is able to select between one of four inputs, in the preferred embodiment multiplexer 304 is a plurality of multiplexers which may be individually or jointly operated upon. Beam logic 46 further comprises three switch arrays 306, 308 and 310, each of which supplies 22 individual leads of logic signals with each of the logic signals being controlled by a resistor switch network such as is illustrated in each block representing the switch arrays. Basically, the network consists of the output lead being tied to a plus-5 volt source through a 1-K resistor, there being a programmable switch which may be closed to short the output lead to ground. When the switch is open, the logic level of the output of the switch is a logic state one; while when the switch is closed the output is a logic state zero.

Array 306 is labelled as being the text reverse even switch array indicating that the outputs of this array indicate which of the individual rays are to be formed during a reverse mode even row condition indicated by the text data. The array 308 is labelled as being a text reverse odd switch array, the label indicating that the outputs of this array indicate the individual rays which are to be formed during a reverse mode odd row condition indicated by the text data. Array 310 is labelled as being a text normal switch array with its outputs indicating the rays that are to be inhibited. The outputs of each array, TRE1-TRE22, TR01 TR022 and TN1-TN22 are applied to the inputs of multiplexer 304 over leads 307, 309 and 311, respectively.

Text data represented by text data bits TD1-TD8 on lead 52 of FIG. 16 are applied through a gating circuit 314 to the A and B select inputs of multiplexer 304 on leads 316 and 318. Also applied to gating circuit 314 is address lead AA0 from the A channel latching counter 290.

The outputs of multiplexer 304 are indicated as being ray data RD1-RD22, each output corresponding to the formation of an individual ray of fine beam 62 in acousto-optic deflector 54 from beam 60. The outputs of multiplexer 304 pass on lead 320 to a 22 bit latch 322 that holds the output ray data in response to a latch signal on lead 324. The output of the 22 bit latch is applied through leads 326 to 22 individual bit drivers 328, there being one individual bit driver for each of the output bits RD1 through RD22. The 22 bit drivers are enabled by a signal on lead 330 and provide their outputs by way of leads 332 to 22 RF oscillators 334, there being one RF or radio frequency oscillator for each of the signals from bit drivers 328 and the outputs of the 22 RF oscillators 334 appearing on leads 56 and being applied to acousto-optic deflector 54.

In operation of the beam logic circuit, instead of there being a straight forward gating of the pattern bits PB1-PB22 by the bits of the text data TD1-TD8, the bits of the text data are used to select, for each of the groups of individual rays indicated in FIG. 13, between the four inputs to multiplexer 304, i.e., graphics pattern bits, reverse mode even bits, reverse mode odd bits, and normal mode bits. But to this extent the illustration of multiplexer 304 in FIG. 16 as selecting between one of the four inputs for all of the ray data bits is somewhat misleading.

A better illustration of the multiplexing that occurs is illustrated in FIG. 18, with FIG. 17 illustrating in chart form the bits of the text data that are used to modulate the individual rays. In FIG. 18, a one of four multiplexer 336 has four groups of input bits, one group for each of the ray data bits output therefrom. From FIG. 17, text data bit TD1 is used to operate on or select the proper output for rays 1-4. As an example, thus, the outputs of one of four multiplexer 336 are indicated as being the ray data bits RD1 through RD4, these of course being the logic signals which determine whether or not rays 1-4 are formed or not. To produce ray data bit RD1, multiplexer 336 may select one of pattern bit pb1, text reverse even bit TRE1, text reverse odd bit TRD1 and text normal bit TN1. Multiplexer 336 may make a similar selection for each of ray data bits RD2-RD4. It should be remembered that when the ray data bits are such as a logic state 1, they indicate that an individual ray should be formed in fine beam 62, while when the ray data bits are at a logic state zero (0), they indicate that no individual ray should be formed in fine beam 62.

Gating circuit 314 is illustrated more fully in FIG. 18. The binary combination of a control bit (text data bit TD7) and an information bit such as text data bit TD1 are used to select between the four inputs to provide an output. Gating circuit 314 also provides for the turning on of the desired individual rays during a reverse mode in the even and odd rows.

When the $\overline{\text{TEXT MODE}}$ signal is a logic state one, indicating that the beam logic is out of the text mode, and is applied to NOR gate 340 on lead 324, then the output thereof is a logic state zero, which is applied to AND gates 344 and 346 on lead 348. The outputs of AND gates 344 and 346 thus are logic states zero and are applied to the A and B inputs of multiplexer 336, which selects the pattern bits pb1-pb4 to be output as the ray data bits RD1-RD4. The same selection occurs when the TD1 input to NOR gate 340 is at a logic state one indicating that the pattern bits pb1-pb4 generated by the graphics data are to be formed by the rays R1-R4. When the $\overline{\text{TEXT MODE}}$ signal is at a logic state zero and the text data bit TD1 is at a logic state zero, the output of a NOR gate 340 is a logic state one that enables AND gates 344 and 346 to provide signals which will select other than the graphics data bits pb1-pb4 to be formed by the rays R1-R4.

In such a case, if signal TD7 is at a logic state one, indicating a normal mode, then the outputs of OR gates 350 and 352 also will be a logic state one, which are applied, respectively, by way of leads 354 and 356 to AND gates 346 and 344. The outputs of AND gates 344 and 346 will then both be logic state one, which will select as the ray data bits RD1-RD4 the logical levels appearing on the text normal signals TN1-TN4. The outputs from the text normal switch array 310 illustrated in FIG. 16 thus must be programmed in logical states.zero so that the formation of individual rays R1-R4 is inhibited, areas on member 64 will remain charged, and will print solid on the receptor. Switch arrays 306, 308, 310 will be understood to be provided in the preferred embodiment for versatility of the apparatus.

In the case where the $\overline{\text{TEXT MODE}}$ signal on lead 342 and the logic level of bit TD1 are logical states zero, if the TD7 signal is a logical state zero indicating the reverse mode, then the outputs of OR gates 350 and 352 will be controlled by the logical level input thereto by the A channel address bit zero, AA0. Signal AA0 is continuosly oscillating between a logic state one and zero, as the fine beam 62 is passed across the surface of the electrophotographic member 64. When bit TD7 is a logical state zero, the output of OR gate 350 is directly controlled by the logical level of signal AA0 while the output of OR gate 352 is the inverse thereof due to inverter 358. For an even row, the outputs provided by AND gates 344 and 346 will be such that multiplexer 336 outputs as ray data bits RD1-RD4 the logical levels appearing at the signals TRE1 through TRE4. At an odd number row, the logic levels output by multiplexer 336 as ray data bits RD1-RD4 will be the logical levels appearing at signals TR01-TR04.

The one of four multiplexer 336 used to form the ray data bit RD1-RD4 is an example of one of the multiplexer circuits used to provide the ray data bits for one of the groups of rays illustrated in connection with the text pixels of FIG. 13. The gating circuit 314 also is the same for each of those multiplexer circuits, with only the information bit TD1 being changed to the corresponding text data bit for the particular group of rays indicated by the chart in FIG. 17.

After the electrophotographic member 64 has been charged at charging station 70 and has been imaged with fine beam 62, the latent image carried thereon is toned at toning station 72.

The purpose of the vertical toning system is to apply toner (carrier fluid having toner particles suspended therein) to the electrophotographic member 64. The areas of member 64 that remain charged after imaging are the areas which accept the toning particles. The toned member thereafter has the toned particles fused to the member for use as a printing plate in such as a lithographic printing press, but this fusing step occurs otherwise than in the apparatus.

The toner that is supplied to the member 64 is in the form of a carrier fluid known as "ISOPAR", which is a registered trademark of the Exxon Corporation. The carrier fluid carries finely ground particles of resinous material which may be positively or negatively charged and in the preferred embodiment herein the particles are positively charged. Hereinafter, the term "toner fluid" will refer to this carrier fluid containing the resinous toner particles while the term "carrier fluid" will refer only to the "ISOPAR" without the resinous particles.

As the member rotates past the toning station 72, there is first applied thereto a quantity of carrier fluid that wets the surface of the member. This wetting of the surface occurs at what may be called an upper chamber of the toning station 72. Thereafter, the toner fluid is applied to the member into phases which may be referred to as the initialization phase and the operational phase. During the initialization phase, a meniscus of toner fluid is established between toning station 72 and member 64, while during the operational phase, the meniscus is maintained between the toning station 72 and the member. Toning station 72 is arranged essentially vertical adjacent the circumference of drum 66, and thereby the meniscus established between toning station 72 and member 64 is essentially vertical.

Turning now to FIG. 19, the toning system is indicated generally by the reference character 400. The toning station 72 comprises left and right hand shoes 402 and 404, respectively, that are used to apply the toner fluid to the member 64, and it is between the shoes and the member 64 that the vertical meniscus is established and maintained. The left-hand shoe 402 is used in conjunction with the left-hand optical system 82, while the right-hand shoe 404 is used in conjunction with the right-hand optical system 84. An explanation of the toning system for the right-hand optical system is an explanation of the toning system for the left-hand optical system, the toning systems for both sides being duplicates of one another. FIG. 19 is a block diagram of one of the left- and right-hand toning systems.

During the initialization phase, carrier fluid is supplied from reservoir system 406 to the right-hand shoe 404 by way of tubing 408 under action of pump 410. Pump 410 operates in response to or under control of controller 412 by way of lead 414. Toner fluid is carried to right-hand shoe 404 from the pressure system 416 by way of tubing 418 under control of pump 420, pump 420 being controlled in turn by controller 412 by leads 422. Excess toner fluid is returned to pressure system 416 from right-hand shoe 404 by way of tubing 424.

Used toner fluid is carried to sump system 426 by way of tubing 428, sump system 426 providing a vacuum or having a vacuum with which to remove the used toner fluid from the member. Used toner fluid contained in sump system 426 may be returned to the reservoir system 406 by way of tubing 430 by action of pump 432, pump 432 in turn being controlled by controller 412 by way of leads 434.

After the meniscus has been established during the initialization phase, valve 436 is used to admit air into pressure system 416 over tubing 438 to aid in the maintenance of the meniscus between the shoe 404 and the member 64.

It is important that the application of the carrier and toner fluids and the operation of the vacuum sump system occur at the proper time intervals as the member 64 is rotated past the shoe 404. A sensor 440 is coupled to drum 66 to obtain the timing information and supplies the timing information to controller 412 by way of leads 444.

The toning station 72 is generally illustrated in FIG. 20 wherein left and right hand shoes 402 and 404 are carried by backplate 440. The backplate 440 carries four rollers, 442, two at each end that are in rolling contact with drum 66 along surfaces 444. Rollers 442 are adjustable by way of a cam mounting to adjust the spacing between shoes 402, 404, and drum 66. The spacing required between the shoes 402, 404 and drum 66 must be sufficient for the electrophotographic member 64 to pass therebetween with sufficient spacing to provide for the meniscus of toner fluid established therebetween.

Toning station 72 has two positions, one being with the rollers engaged against the surfaces 444 of drum 66 during an imaging and toning cycle, and the other position being spaced from the drum and at a level below the drum in a non-toning position. A pneumatic or hydraulic cylinder 446 is provided to move the toning station 72 between these two positions and further is used to provide a slight bias to maintain rollers 442 in contact with surfaces 444. Rollers 442 are engaged against surfaces 444 at the two longitudinal ends of drum 66 so as not to intefere with member 64 which is carried on drum 66. Of course, any surfaces as may be desired may be provided upon which the rollers of plate 440 may ride.

In FIG. 21 right-hand shoe 404 is essentially a rectangular solid with a surface 446 that is to be placed adjacent the drum 66, surface 446 having a portion 448 which is concave. The radius of this concave portion 448 is essentially equal to the radius of the drum 66 so that the concave portion 448 may be spaced equidistant from drum 66 across its entire area.

A generally H-shaped seal member 450 is carried on shoe 404 at the concave portion 448. Seal member 450 has vertical standards arranged adjacent the curved edges of concave portion 448 with the cross bar 452 of the "H" being offset towards the top of the seal. The seal is made from a resilient material such as polyurethane and is mounted into slots extending into the shoe. The seal is constructed so that when the shoe 404 is in the toning position, the edges of the seal 450 extending furthest from the shoe are engaged against the outer surface of the electrophotographic member 64.

The cross-bar 452 of the seal 450 separates the concave portion 448 into upper and lower portions 454 and 456. In the upper portion 454, clear carrier fluid is applied to the member 64. This provides a precoating or wetting of the member 64 with this precoating acting as a barrier against toner particles that are not charged becoming lodged on the member 64 to reduce fogging of the latent image. This precoating further provides a lubricant for the seal 450 to reduce wear of the seal, improve the sealing characteristics thereof and reduce the power which would otherwise be required to be supplied by motor 90 to drive the drum 66.

Cross-bar 452 is constructed to provide a wiper blade portion 458 FIG. 22 that allows only a microscopic coating of the carrier fluid to remain on the member 64 as it passes thereby. Of course, the wiper blade portion 458 as it is wiped across the member 64 does not disturb the quality of characteristics of the latent image carried thereon. It will further be appreciated that the carrier fluid applied in upper portion 454 does not affect the quality or characteristics of the latent image on member 64.

The upper portion 454 comprises an upper chamber 460 extending into shoe 404 and opening to concave surface 448. Supply ports 462 are arranged spaced from one another along the inner wall of the upper chamber 460 to supply carrier fluid transported by tubing 408 from reservoir system 406 for application to the member 64. A baffle 464 shown in FIG. 22 is contained in upper chamber 460 so that carrier fluid from ports 462 may be evenly supplied to member 64 across the length of chamber 460.

The lower portion 456 of the concave portion 448 is the portion where toner fluid is applied to member 64. A lower chamber 466 extends into shoe 404, is open to concave portion 448 and extends essentially the length of the shoe. Toner fluid is supplied to lower chamber 466 by the way of inlet ports 468 spaced along the length of chamber 466 with the toner fluid being supplied from pressure system 416 by way of tubing 418. A baffle 470 may be provided in lower chamber 466 to evenly supply toner fluid to member 64 from the individual inlet ports 468.

From lower chamber 466, toner fluid may flow down in the direction indicated by arrow 472 in FIG. 22 along concave portion 448 to vacuum slot 474.

A reduction in atmospheric pressure or a vacuum is created at vacuum slot 474 by sump system 426 (FIG. 19) by way of tubing 428. This vacuum operates to remove toner fluid from both member 64 and shoe 404 as the toner fluid flows down along the concave portion 448. From vacuum slot 474, toner fluid is carried to sump system 426 by tubing 428. The vacuum provided by sump system 426 may be formed by any means desired.

Outlet ports 476 are provided opening from lower chamber 466, spaced along the length of lower chamber 466 and against an upper wall thereof, as is illustrated in FIG. 22. Outlet ports 474 provide for return of excess toner fluid by way of tubing 424 to pressure system 416.

FIG. 22 generally illustrates the angular relationship between charging station 70, the incidence of fine beam 62, the member 64 and the position of shoe 404. In the preferred embodiment, the angle A between the center line of charging station 70 and fine beam 62 is about 25°. The angle B between fine beam 62 and the center line of shoe 404 is about 30°. While these angles are indicative of the preferred embodiment, it is desired to reduce these angles to be as small as possible so that there is a minimum time between the charging of the member 64 and the toning of the latent image on member 64.

Charging station 70 comprises a charging wire 480 with a guard 482 forming a three-sided channel which is open towards drum 66. Wire 480 of course extends along the length of drum 66 as does guard 482. In the preferred embodiment, wire 480 carries a negative voltage and cover 482 may be made of conductive material and forms an electrostatic mirror.

Area 484 along the interface between drum 66 and 244 is shown enlarged in FIG. 23 to illustrate the relative positions between drum 66, electrophotographic member 64, toner fluid 486 and shoe 404. The relative thicknesses of the elements are expanded in FIG. 23 for illustrative purposes.

The operation of the toning system may best be understood by considering that there are phases to its operation. After the member 64 is pre-wetted with carrier fluid, the first phase occurs and is known as the initial phase. During this phase, the toner system establishes a meniscus of toner fluid between shoe 404 and member 64. During the operational phase, which occurs next, this meniscus is maintained between member 64 and shoe 404 and flows in the direction indicated by arrow 472 at a controlled rate essentially equal to the angular rotation of the drum. Thus, as member 64 is moved past chamber 466, a quantity of toner fluid is applied against member 64 and remains stationary relative to member 64, until it is removed at vacuum slot 474. This provides a minimum amount of sheer between the meniscus and member 64 which provides for suitable toning of the latent image with the toning particles.

At this point, it will be discussed how the pre-wetting reduces the fogging of the latent image. The toner fluid, as has been said, contains toner particles or resinous material. These particles are very sticky in that they will readily adhere to most any surface they are brought into contact with. When the toner fluid is manufactured, these particles are given in this case, a positive charge so that they will be attracted only to the areas which retain their negative charge from charging station 70. Not all of these particles however, remain charged by the time they are used in the toning system herein.

When the toning fluid is used in the toning system, the charged particles readily are attracted to the oppositely charged areas of the latent image carried by member 64. The non-charged particles however, are not so attracted and will stick to any surface to which they may come into contact with. By pre-wetting the surface of member 64, a barrier is formed through which these non-charged particles generally will not pass. Although this pre-wetting provides what is referred to as a barrier the action that is involved is more along the lines of the non-charged particles not passing through the pre-wet because there is no force that will drive them through the barrier.

During the commencement of the toning cycle, toner fluid is applied to the lower chamber 466 and falls essentially by means of gravity into the space established between concave portion 448 and member 64. The rate at which toner fluid is supplied to chamber 466 is much greater than the rate at which toner fluid may flow between concave surface 448 and member 64 with excess toner fluid being returned to the pressure system 416 through the outlet ports 476 by way of tubing 424. Pressure system 416 is sealed from the atmosphere and as toner fluid is removed from the pressure system by way of the meniscus which is formed between concave surface 448 and member 64, a negative pressure is formed in the pressure tank. When this negative pressure reaches a magnitude of from two to three inches of water, the toner fluid ceases to flow between the concave surface and the member 64. Air control valve 436 is preset to allow a controlled and predetermined amount of air into the closed pressure system 416, and then controls the flow rate of the toner fluid in the meniscus between the concave surface 448 and member 64.

If the air flow control valve 436 were to be closed, the meniscus would essentially remain stationary in the vertical position discounting of course losses from the lower edge thereof occurring from gravity and from the vacuum slot 474. As the air flow control valve 436 is opened, the rate of flow of toner fluid through the vertical meniscus increases. The establishment of this negative pressure in the pressure system 416 and the simultaneous establishment of the meniscus between concave portion 448 and member 64 is what has been defined to be the initial phase. Once the initial phase is completed, operation of the toning occurs through what has been described the operation phase. It should be understood that there are not two separate phases that are in operation in the toning system, but rather two phases that are used to describe the operation of the toning system.

The rate at which air is allowed into the pressure system 416 through control valve 436 is predetermined so that the flowrate of toner fluid therebetween occurs at the same speed as the angular rate of rotation of drum 66. Thus, the toner fluid flows essentially stationary to the member 64. As the lower edge of the meniscus approaches the vacuum slot 474, toner fluid less the toner particles attracted to the member 64 by the latent image is removed from the member 64 with the described vacuum.

In summary, the vertical toning system provides a meniscus of toning fluid which is essentially stationary relative to the movement of the electrophotographic member member 64 to provide toning of the latent image on the member 64. Control of the flow of the meniscus relative to the member may be easily controlled through a suitable air control valve 436 and the toner fluid is applied to member 64 after a period of time which is relatively short after imaging of the member has occurred.

Clear carrier fluid is indicated in upper chamber 460 by reference character 490, while toner fluid is indicated in the lower chamber 466 by reference character 486.

In the preferred embodiment, the meniscus has a thickness or the concave portion 48 is spaced from member 64 a distance of about 13/1000 of an inch. Shoe 404 may be made of any material which is nonreactive to the "ISOPAR" carrier fluid, such as aluminum or stainless steel. It further should be noted that when the toning station 72 is removed from being adjacent drum 66 to the non-toning position, the vacuum which is created at vacuum slot 474 is increased to clear off both the shoe and the member.

It is important that the commencement of the flowing of the carrier fluid and toner fluid to the shoe occur at the proper time in relationship to the movement of the member 64 across the shoe 404. If these fluids are applied to the shoe too early, they are not contained within the seals provided by seal member 450 and may cause a mess while if the fluids are applied too late, the seals may stick to the member 64.

Referring back to the two toner shoes 404 and 404, it is entirely possible that one toning shoe could be used in place of the two shoes.

Modifications and variations of the present invention are possible in light of the above teachings. It is therefore to be understood that within the scope of the claims the invention may be practiced otherwise than is specifically described.

What is claimed and desired to be secured by Letters Patent of the United States is:

1. A field flattening lens system for use in an optical imaging system, said system including a raster mirror, oscillating from side to side around a vertical axis, an elongate member to be imaged, said member being imaged along a horizontal image line which is spaced from said vertical axis, and a focused beam of light traveling along an optical path approaching said raster mirror in a straight line and leaving said raster mirror along a straight line that is swept from side to side in a plane by oscillation of said raster mirror, said plane including said horizontal image line, said lens system comprising:
a plurality of lens components arranged between said raster mirror and said member with said optical path passing therethrough, the lens components including from the object to the image end a first negative component having a concave object side surface, a second positive component having a concave object side surface, a third positive component having a substantially flat object side surface and a fourth component having a flat object side surface, the lens components providing unitary magnification and maintaining said beam in focus at said image line along said elongate member as said optical path leaving said raster mirror is swept from side to side, each component being made from a material having a low index of refraction.

2. The lens as claimed in claim 1 defined substantially by the following data, where the components L1, L2, L3 and L4 comprise respectively the first, second, third and fourth components:

| LENS | Radius | Axial Distance Between Surfaces (mm) | $N_d$ | $V_d$ |
|---|---|---|---|---|
| L1 | R1 −161.744 | | 1.617 | 36.6 |
| | | 15.00 | | |
| | R2 ∞ | 6.97 | | |
| L2 | R3 −216.311 | | 1.523 | 58.6 |
| | | 28.871 | | |
| | R4 −213.119 | | | |
| | | 0.20 | | |
| L3 | R5 −2575.204 | | 1.523 | 58.6 |
| | | 18.06 | | |
| | R6 −264.288 | | | |
| | | 0.20 | | |
| L4 | R7 ∞ | | 1.523 | 58.6 |
| | | 13.00 | | |
| | R8 −265.847 | | | | where L1–L4 are lens components from the object to the image end, R1–R8 are the radii of the surfaces of the lens components, $N_d$ is the index of refraction, and $V_d$ is the Abbe number of components L1 through L4.

* * * * *